(12) United States Patent
Huang

(10) Patent No.: US 11,972,631 B2
(45) Date of Patent: Apr. 30, 2024

(54) SKIN TEXTURE CONTROL SYSTEM, SKIN TEXTURE CONTROL METHOD, SKIN TEXTURE SAMPLING DEVICE, AND COMPUTER-READABLE MEDIUM

(71) Applicant: CHIEN JUNG TECHNOLOGY CO., LTD., Zhubei (TW)

(72) Inventor: Jih-Fon Huang, Zhubei (TW)

(73) Assignee: CHIEN JUNG TECHNOLOGY CO., LTD., Zhubei (TW)

( * ) Notice: Subject to any disclaimer, the term of this patent is extended or adjusted under 35 U.S.C. 154(b) by 0 days.

(21) Appl. No.: 17/992,873

(22) Filed: Nov. 22, 2022

(65) Prior Publication Data

US 2023/0215213 A1    Jul. 6, 2023

Related U.S. Application Data

(60) Provisional application No. 63/294,867, filed on Dec. 30, 2021.

(51) Int. Cl.
| | | |
|---|---|---|
| G06V 40/12 | (2022.01) | |
| G06F 21/32 | (2013.01) | |
| G06F 21/44 | (2013.01) | |
| G06V 10/75 | (2022.01) | |
| G06V 40/13 | (2022.01) | |

(52) U.S. Cl.
CPC .......... *G06V 40/1359* (2022.01); *G06F 21/32* (2013.01); *G06F 21/44* (2013.01); *G06V 10/751* (2022.01); *G06V 40/1306* (2022.01); *G06V 40/1376* (2022.01); *G06F 2221/2137* (2013.01)

(58) Field of Classification Search
CPC ............ G06V 40/1359; G06V 10/751; G06V 40/1306; G06V 40/1376; G06V 40/12; G06F 21/32; G06F 21/44; G06F 2221/2137; G06F 3/0488
See application file for complete search history.

(56) References Cited

U.S. PATENT DOCUMENTS

| | | |
|---|---|---|
| 7,099,497 B2 | 8/2006 | Chou et al. |
| 8,913,801 B2 | 12/2014 | Han et al. |

(Continued)

FOREIGN PATENT DOCUMENTS

| | | |
|---|---|---|
| ES | 2705581 T3 | 3/2019 |
| JP | 6461225 B2 | 1/2019 |

(Continued)

*Primary Examiner* — Abhishek Sarma

(57) ABSTRACT

A skin texture control system, a skin texture control method, a skin texture sampling device, and a computer-readable medium storing a code of the skin texture control method are provided. The skin texture control system includes a skin texture feature generation module for generating a skin texture feature of a skin texture, which includes a sampling unit for sampling the skin texture and generating skin texture sampling data in a first period of a working period; and a feature generating unit for generating skin texture stripe data according to the skin texture sampling data and generating the skin texture feature of the skin texture by the skin texture stripe data in a second period; and a control module connected to the skin texture feature generating module for receiving the skin texture feature and outputting a control command by the skin texture feature of the skin texture in a third period.

19 Claims, 24 Drawing Sheets

(56) References Cited

U.S. PATENT DOCUMENTS

| | | |
|---|---|---|
| 9,419,162 B2 | 8/2016 | Lin |
| 2010/0220900 A1 | 9/2010 | Orsley |
| 2014/0341446 A1 | 11/2014 | Hare et al. |
| 2017/0257698 A1 | 9/2017 | Boesen et al. |
| 2020/0027912 A1* | 1/2020 | Kim .................. H01L 27/14623 |

FOREIGN PATENT DOCUMENTS

| | | |
|---|---|---|
| WO | 2018227514 A1 | 12/2018 |
| WO | 2019100368 A1 | 5/2019 |

* cited by examiner

Fingerprint sampling image of child

Fingerprint sampling image of adult

Adult        Child

Fingerprint sampling image of child

Fingerprint sampling image of adult

Fingerprint sampling image of child

Fingerprint sampling image of adult

Fingerprint sampling image of child

Fingerprint sampling image of adult

Fingerprint sampling image of child

Fingerprint sampling image of adult

Time:1

Time:2

Time:1

Time:2

SKIN TEXTURE CONTROL SYSTEM, SKIN TEXTURE CONTROL METHOD, SKIN TEXTURE SAMPLING DEVICE, AND COMPUTER-READABLE MEDIUM

CROSS-REFERENCE TO RELATED APPLICATIONS

This application claims the benefit of U.S. Provisional Application No. 63/294,867, filed on Dec. 30, 2021, which is hereby incorporated by reference for all purposes as if fully set forth herein.

FIELD OF THE INVENTION

The present invention relates to a skin texture control system, a skin texture control method, and a computer-readable medium, and more particularly to a skin texture control system and a skin texture control method for generating a skin texture feature of a skin texture according to skin texture stripes and outputting a control command, wherein the computer-readable medium stores a program code of the skin texture control method.

BACKGROUND OF THE INVENTION

An existing fingerprint recognition system must require a user to press a fingerprint and sample the fingerprint when the user uses the fingerprint recognition system at a first time, so as to pre-establish and store fingerprint data (that is, pre-established fingerprint data) of the user. After the fingerprint data of the user was established, the pre-established fingerprint data are compared with the fingerprint data of the current user to recognize whether the current user is a user who had pre-established the fingerprint data in the fingerprint recognition system.

During the process of comparing the fingerprint data of the user with the fingerprint data of the fingerprint pressed by the current user, data comparison is usually performed by finding and recording a branch point of a fingerprint ridge, an endpoint of the fingerprint ridge, and a circle formed by the fingerprint in fingerprint lines to recognize whether the current user is the user who has pre-established the fingerprint data in the fingerprint recognition system.

The above-mentioned fingerprint recognition method has a higher recognition ability and pertinence (that is, only the user who has pre-established the fingerprint data may further use other functions included in the system) for the users. However, because of the recognition ability and pertinence of the existing fingerprint recognition method, the fingerprint recognition system is forced to spend more computing power and time on fingerprint data comparison when the fingerprint recognition system compares the fingerprint data, thereby causing a huge burden on the system. Moreover, because of its pertinence, even if an owner of the system is willing to share the system for others to use, it may be impossible for others to use the system because the fingerprint data has not been pre-established in the system. Alternatively, when it is necessary to temporarily authorize others to use the system, even if there is a willingness to authorize others to use the system temporarily, it will not be able to authorize others to use it smoothly because of its pertinence and temporality.

In addition, when the fingerprint of the user is damaged due to factors such as trauma and the like, it is also possible that the user cannot use the system through the pre-established fingerprint data before the fingerprint status is restored and only can further use other functions included in the system by using other pre-established fingerprint data because a current fingerprint status of the user is not the same as a fingerprint data status at the time of login, due to the existing fingerprint recognition system's higher recognition ability, even if the fingerprint data has been pre-established. If the user does not login other fingerprint data, it will bring great inconvenience to the user, and other functions included in the system will not be available before the fingerprint of the user is restored.

SUMMARY OF THE INVENTION

In view of this, the present invention provides a skin texture control system, a skin texture control method, a skin texture sampling device, and a computer-readable medium, which may sample a skin texture of a user and generate skin texture sampling data in a first period of a working period, then generate skin texture stripe data according to the skin texture sampling data and then generate a skin texture feature of the skin texture by the skin texture stripe data in a second period following the first period, and receive the skin texture feature and output a control command corresponding to the skin texture feature in a third period following the second period. With the above functions, the present invention does not need to pre-establish and store skin texture data of users, and does not need to compare the skin texture data with the pre-established and stored skin texture data of the users, thereby achieving the technical effects of reducing the computational burden of the system, making the system operate faster, consuming less power, requiring less memory, and just informing others about a control mode of the skin texture feature in the system to authorize others to use the system even if there is a need to temporarily authorize others to use the system.

The skin texture control system provided by the present invention includes: a skin texture feature generating module for generating a skin texture feature of a skin texture in a working period, which includes: a sampling unit for sampling the skin texture and generating skin texture sampling data in a first period of the working period; and a feature generating unit for generating skin texture stripe data according to the skin texture sampling data, and then generating the skin texture feature of the skin texture by the skin texture stripe data in a second period following the first period; and a control module connected to the skin texture feature generating module for receiving the skin texture feature and outputting a control command corresponding to the skin texture feature in a third period following the second period.

In an embodiment of the present invention, the feature generating unit of the aforementioned skin texture control system converts the skin texture sampling data into 1-bit (or binary) grayscale depth image data by binary image processing, and then generates the skin texture stripe data with a first binary grayscale value and a second binary grayscale value in the binary grayscale depth image data.

In an embodiment of the present invention, the feature generating unit of the aforementioned skin texture control system converts the skin texture sampling data into multi-bit grayscale depth image data by multi-bit depth grayscale value conversion image processing, and then generates the skin texture stripe data according to a multi-bit grayscale value in the multi-bit grayscale depth image data.

In an embodiment of the present invention, the feature generating unit of the aforementioned skin texture control system further generates the skin texture feature with a first pixel number greater than a first grayscale threshold or a second pixel number less than a second grayscale threshold in the multi-bit grayscale depth image data.

In an embodiment of the present invention, the aforementioned skin texture control system further includes: a controlled module with a power switching circuit, the controlled module being connected to the control module for receiving the control command, wherein the control command includes controlling ON/OFF states of the power switching circuit in the controlled module.

In an embodiment of the present invention, the aforementioned skin texture control system further includes: a controlled module with a pad lock, the controlled module being connected to the control module for receiving the control command, wherein the control command includes performing a password input on the pad lock of the controlled module, and the password input is a sequence of the skin texture feature generated when the skin texture touches the skin texture feature generating module.

In an embodiment of the present invention, the aforementioned skin texture control system further includes: a controlled module with a selection input circuit, the controlled module being connected to the control module for receiving the control command, wherein the control command includes performing a selection input on the selection input circuit of the controlled module, and the selection input is an input performed with the skin texture feature as an input option.

In an embodiment of the present invention, the aforementioned skin texture control system further includes: a controlled module with a volume adjustment circuit, the controlled module being connected to the control module for receiving the control command, wherein the control command includes performing a volume adjustment through the volume adjustment circuit of the controlled module.

In an embodiment of the present invention, the sampling unit of the aforementioned skin texture control system includes: a first sensing pixel line of which a plurality of sensing pixels are arranged along a first direction at equal intervals.

In an embodiment of the present invention, the sampling unit of the aforementioned skin texture control system further includes: a second sensing pixel line of which a plurality of sensing pixels are arranged along a second direction at equal intervals.

In an embodiment of the present invention, the first direction and the second direction in the aforementioned skin texture control system are perpendicular to each other.

In an embodiment of the present invention, the sampling unit of the aforementioned skin texture control system includes: a plurality of first sensing pixel lines, a plurality of sensing pixels of each of the plurality of first sensing pixel lines being arranged along a first direction at equal intervals; and a plurality of second sensing pixel lines, a plurality of sensing pixels of each of the plurality of second sensing pixel lines being arranged along a second direction at equal intervals, wherein the first direction and the second direction are perpendicular to each other.

In an embodiment of the present invention, the plurality of sensing pixels of the sampling unit of the aforementioned skin texture control system are arranged in an arrangement mode of a plurality of linear sensing pixel lines staggered mutually.

In an embodiment of the present invention, the plurality of sensing pixels of the sampling unit of the aforementioned skin texture control system are arranged in an arrangement mode of an array sensing area.

In an embodiment of the present invention, the feature generating unit of the aforementioned skin texture control system generates the skin texture stripe data according to part of the skin texture sampling data in the second period of the working period.

In an embodiment of the present invention, the skin texture stripe data of the aforementioned skin texture control system includes at least any one of the length, spacing, number, sweat pores, and clarity of skin texture stripes.

In an embodiment of the present invention, the skin texture feature of the aforementioned skin texture control system includes at least any one of a fingertip portion of a fingerprint, a side portion of the fingerprint, a finger pulp portion of the fingerprint, a skin texture size, and a skin texture deflection.

Another skin texture control system provided by the present invention includes: a skin texture feature generating module for generating a skin texture sliding direction of a skin texture, which includes: a sampling unit, including: a timing unit for calculating a unit of time; and a plurality of sensing pixels classified into a plurality of sensing pixel lines arranged in a first direction along the first direction for sampling the skin texture and generating a plurality of pieces of first-direction skin texture primary sampling data at a first time, and sampling the skin texture and generating a plurality of pieces of first-direction skin texture secondary sampling data at a second time; and a feature generating unit for respectively converting the first-direction skin texture primary sampling data and the first-direction skin texture secondary sampling data into a plurality of pieces of first-direction skin texture multi-bit depth primary image data and a plurality of pieces of first-direction skin texture multi-bit depth secondary image data by multi-bit depth grayscale value conversion image processing, and then generating the skin texture sliding direction of the skin texture according to the first-direction skin texture multi-bit depth primary image data and the first-direction skin texture multi-bit depth secondary image data; and a control module connected to the skin texture feature generating module for receiving the skin texture sliding direction and outputting a control command corresponding to the skin texture sliding direction.

In an embodiment of the present invention, the feature generating unit of the aforementioned skin texture control system further performs a grayscale value difference operation and an absolute value operation on the first-direction skin texture multi-bit depth primary image data and the first-direction skin texture multi-bit depth secondary image data to obtain an operation result, and generates the skin texture sliding direction of the skin texture according to the operation result.

In an embodiment of the present invention, the feature generating unit of the aforementioned skin texture control system further generates the skin texture sliding direction of the skin texture when the operation result is less than a grayscale difference threshold.

In an embodiment of the present invention, the aforementioned skin texture control system further includes: a controlled module with a power switching circuit, the controlled module being connected to the control module for receiving the control command, wherein the control command includes controlling ON/OFF states of the power switching circuit in the controlled module.

In an embodiment of the present invention, the aforementioned skin texture control system further includes: a controlled module with a pad lock, the controlled module being connected to the control module for receiving the control command, wherein the control command includes performing a password input on the pad lock of the controlled module by the skin texture sliding direction.

In an embodiment of the present invention, the aforementioned skin texture control system further includes: a controlled module with a selection input circuit, the controlled module being connected to the control module for receiving the control command, wherein the control command includes performing a selection input on the selection input circuit of the controlled module, and the selection input is an input performed with the skin texture sliding direction as an input option.

In an embodiment of the present invention, the aforementioned skin texture control system further includes: a controlled module with a display module, the controlled module being connected to the control module for receiving the control command, wherein the control command includes performing a display image moving operation on the display module of the controlled module.

In an embodiment of the present invention, the aforementioned skin texture control system further includes: a controlled module with a volume adjustment circuit, the controlled module being connected to the control module for receiving the control command, wherein the control command includes performing a volume adjustment through the volume adjustment circuit of the controlled module.

In an embodiment of the present invention, the skin texture sliding direction and the first direction in the aforementioned skin texture control system are perpendicular to each other.

The skin texture control method provided by the present invention is applicable to the skin texture control system, and the skin texture control system includes: a skin texture feature generating module and a control module, wherein the skin texture feature generating module is connected to the control module, and the skin texture control method includes: sampling a skin texture and generating skin texture sampling data in a first period of a working period; generating skin texture stripe data according to the skin texture sampling data, and then generating a skin texture feature of the skin texture by the skin texture stripe data in a second period following the first period; and receiving the skin texture feature and outputting a control command corresponding to the skin texture feature in a third period following the second period.

In an embodiment of the present invention, the aforementioned skin texture control method further includes: converting the skin texture sampling data into binary grayscale depth image data by binary image processing, and then generating the skin texture stripe data with a first binary grayscale value and a second binary grayscale value in the binary grayscale depth image data in the second period.

In an embodiment of the present invention, the aforementioned skin texture control method further includes: converting the skin texture sampling data into multi-bit grayscale depth image data by multi-bit depth grayscale value conversion image processing, and then generating the skin texture stripe data according to a multi-bit grayscale value in the multi-bit grayscale depth image data in the second period.

In an embodiment of the present invention, the aforementioned skin texture control method further includes: generating the skin texture feature with a first pixel number greater than a first grayscale threshold or a second pixel number less than a second grayscale threshold in the multi-bit grayscale depth image data in the second period.

In an embodiment of the present invention, the skin texture control system using the aforementioned skin texture control method further includes a controlled module with a power switching circuit, the controlled module is connected to the control module for receiving the control command, and the skin texture control method further includes: in the third period, the control command includes controlling ON/OFF states of the power switching circuit in the controlled module.

In an embodiment of the present invention, the skin texture control system using the aforementioned skin texture control method further includes a controlled module with a pad lock, the controlled module is connected to the control module for receiving the control command, and the skin texture control method further includes: in the third period, the control command includes performing a password input on the pad lock of the controlled module, wherein the password input is a sequence of the skin texture feature generated when the skin texture touches the skin texture feature generating module.

In an embodiment of the present invention, the skin texture control system using the aforementioned skin texture control method further includes a controlled module with a selection input circuit, the controlled module is connected to the control module for receiving the control command, and the skin texture control method further includes: in the third period, the control command includes performing a selection input on the selection input circuit of the controlled module, wherein the selection input is an input performed with the skin texture feature as an input option.

In an embodiment of the present invention, the skin texture control system using the aforementioned skin texture control method further includes a controlled module with a volume adjustment circuit, the controlled module is connected to the control module for receiving the control command, and the skin texture control method further includes: in the third period, the control command includes performing a volume adjustment through the volume adjustment circuit of the controlled module.

In an embodiment of the present invention, the skin texture feature generating module in the aforementioned skin texture control method includes: a first sensing pixel line of which a plurality of sensing pixels are arranged along a first direction at equal intervals.

In an embodiment of the present invention, the skin texture feature generating module in the aforementioned skin texture control method further includes: a second sensing pixel line of which a plurality of sensing pixels are arranged along a second direction at equal intervals.

In an embodiment of the present invention, the first direction and the second direction in the aforementioned skin texture control method are perpendicular to each other.

In an embodiment of the present invention, the skin texture feature generating module in the aforementioned skin texture control method includes: a plurality of first sensing pixel lines, a plurality of sensing pixels of each of the plurality of first sensing pixel lines being arranged along a first direction at equal intervals; and a plurality of second sensing pixel lines, a plurality of sensing pixels of each of the plurality of second sensing pixel lines being arranged along a second direction at equal intervals, wherein the first direction and the second direction are perpendicular to each other.

In an embodiment of the present invention, the plurality of sensing pixels of the skin texture feature generating module in the aforementioned skin texture control method are arranged in an arrangement mode of a plurality of linear sensing pixel lines staggered mutually.

In an embodiment of the present invention, the plurality of sensing pixels of the skin texture feature generating module in the aforementioned skin texture control method are arranged in an arrangement mode of an array sensing area.

In an embodiment of the present invention, the aforementioned skin texture control method further includes: generating the skin texture stripe data according to part of the skin texture sampling data in the second period of the working period.

In an embodiment of the present invention, the skin texture stripe data in the aforementioned skin texture control method includes at least any one of the length, spacing, number, pores, and clarity of skin texture stripes.

In an embodiment of the present invention, the skin texture feature in the aforementioned skin texture control method includes at least any one of a fingertip portion of a fingerprint, a side portion of the fingerprint, a finger pulp portion of the fingerprint, a skin texture size, and a skin texture deflection.

Another skin texture control method provided by the present invention is applicable to another skin texture control system, and the skin texture control system includes: a skin texture feature generating module and a control module, wherein the skin texture feature generating module is connected to the control module, and the skin texture control method includes: classifying a plurality of sensing pixels of the skin texture feature generating module into a plurality of sensing pixel lines arranged in a first direction along the first direction; sampling a skin texture and generating a plurality of pieces of first-direction skin texture primary sampling data at a first time; sampling the skin texture and generating a plurality of pieces of first-direction skin texture secondary sampling data at a second time; respectively converting the first-direction skin texture primary sampling data and the first-direction skin texture secondary sampling data into a plurality of pieces of first-direction skin texture multi-bit depth primary image data and a plurality of pieces of first-direction skin texture multi-bit depth secondary image data by multi-bit depth grayscale value conversion image processing, and then generating a skin texture sliding direction of the skin texture according to the first-direction skin texture multi-bit depth primary image data and the first-direction skin texture multi-bit depth secondary image data; and receiving, by the control module, the skin texture sliding direction and outputting a control command corresponding to the skin texture sliding direction.

In an embodiment of the present invention, the aforementioned skin texture control method further includes: performing a grayscale value difference operation and an absolute value operation on the first-direction skin texture multi-bit depth primary image data and the first-direction skin texture multi-bit depth secondary image data to obtain an operation result, and generating the skin texture sliding direction of the skin texture according to the operation result.

In an embodiment of the present invention, the aforementioned skin texture control method further includes: generating the skin texture sliding direction of the skin texture when the operation result is less than a grayscale difference threshold.

In an embodiment of the present invention, the skin texture control system using the aforementioned skin texture control method further includes: a controlled module with a power switching circuit, the controlled module being connected to the control module for receiving the control command; and the skin texture control method further includes: the control command includes controlling ON/OFF states of the power switching circuit in the controlled module.

In an embodiment of the present invention, the skin texture control system using the aforementioned skin texture control method further includes: a controlled module with a pad lock, the controlled module being connected to the control module for receiving the control command; and the skin texture control method further includes: the control command includes performing a password input on the pad lock of the controlled module by the skin texture sliding direction.

In an embodiment of the present invention, the skin texture control system using the aforementioned skin texture control method further includes: a controlled module with a selection input circuit, the controlled module being connected to the control module for receiving the control command; and the skin texture control method further includes: the control command includes performing a selection input on the selection input circuit of the controlled module, wherein the selection input is an input performed with the skin texture feature as an input option.

In an embodiment of the present invention, the skin texture control system using the aforementioned skin texture control method further includes: a controlled module with a display module, the controlled module being connected to the control module for receiving the control command; and the skin texture control method further includes: the control command includes performing a display image moving operation on the display module of the controlled module.

In an embodiment of the present invention, the skin texture control system using the aforementioned skin texture control method further includes: a controlled module with a volume adjustment circuit, the controlled module being connected to the control module for receiving the control command; and the skin texture control method further includes: the control command includes performing a volume adjustment through the volume adjustment circuit of the controlled module.

In an embodiment of the present invention, the skin texture sliding direction in the aforementioned skin texture control method includes at least any one of upward sliding of the skin texture, downward sliding of the skin texture, leftward sliding of the skin texture, and rightward sliding of the skin texture.

In an embodiment of the present invention, the skin texture sliding direction and the first direction in the aforementioned skin texture control method are perpendicular to each other.

The computer-readable medium provided by the present invention stores a code of the aforementioned skin texture control method, and a processor in a computer system may execute the code stored in the computer-readable medium.

The skin texture sampling device provided by the present invention is configured for sampling a skin texture and generating skin texture sampling data, and includes: a first sensing pixel line of which a plurality of sensing pixels are arranged along a first direction at equal intervals.

In an embodiment of the present invention, the aforementioned skin texture sampling device further includes: a second sensing pixel line of which a plurality of sensing pixels are arranged along a second direction at equal intervals.

In an embodiment of the present invention, the first direction and the second direction in the aforementioned skin texture sampling device are perpendicular to each other.

Another skin texture sampling device provided by the present invention is configured for sampling a skin texture and generating skin texture sampling data, and includes: a plurality of first sensing pixel lines, a plurality of sensing pixels of each of the plurality of first sensing pixel lines being arranged along a first direction at equal intervals; and a plurality of second sensing pixel lines, a plurality of sensing pixels of each of the plurality of second sensing pixel lines being arranged along a second direction at equal intervals, wherein the first direction and the second direction are perpendicular to each other.

Another skin texture sampling device provided by the present invention is configured for sampling a skin texture and generating skin texture sampling data, and includes: a plurality of sensing pixels arranged in an arrangement mode of a plurality of linear sensing pixel lines staggered mutually.

In conclusion, the present invention may sample the skin texture of the user and generate the skin texture sampling data in the first period of the working period, then generate the skin texture stripe data according to the skin texture sampling data and then generate the skin texture feature of the skin texture by the skin texture stripe data in the second period following the first period, and receive the skin texture feature and output the control command corresponding to the skin texture feature in the third period following the second period. With the above functions, the present invention does not need to pre-establish and store skin texture data of users and does not need to compare the skin texture data with the pre-established and stored skin texture data of the users, thereby achieving the technical effects of reducing the computational burden of the system, making the system operate faster, consuming less power, requiring less memory, and just informing others about a control mode of the skin texture feature in the system to authorize others to use the system even if there is a need to temporarily authorize others to use the system.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

Figure 1:
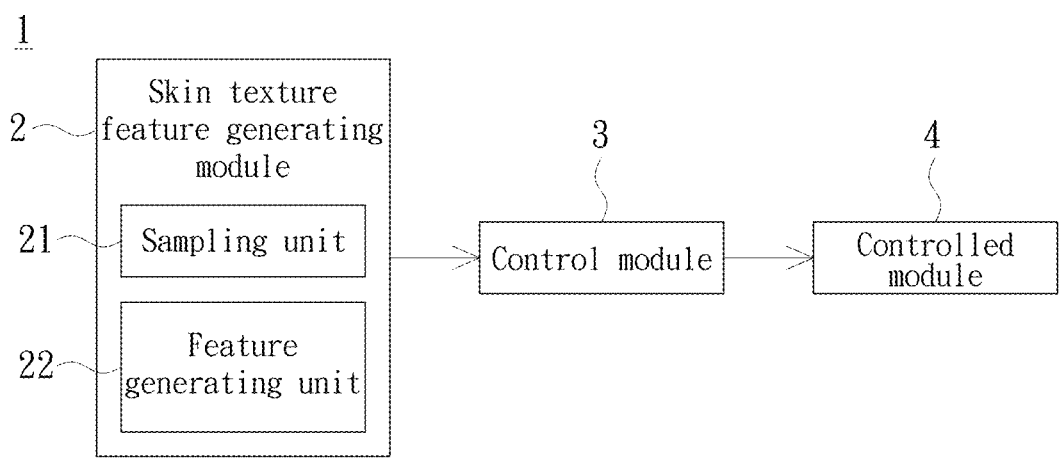
FIG. 1 is a block diagram of a skin texture control system provided by an embodiment of the present invention.

Refer to FIG. 1, which is a block diagram of a skin texture control system provided by an embodiment of the present invention.

In this embodiment, the skin texture control system 1 provided by the present invention includes a skin texture feature generating module 2, a control module 3, and a controlled module 4. The skin texture feature generating module 2 is connected to the control module 3, and the control module 3 is connected to the controlled module 4.

In this embodiment, the skin texture control system 1 provided by the present invention samples a skin texture of a user and generates skin texture sampling data in a first period of a working period and generates skin texture stripe data according to the skin texture sampling data and then generates a skin texture feature of the skin texture by the skin texture stripe data in a second period following the first period by the skin texture feature generating module 2, and receives the skin texture feature and outputs a control command corresponding to the skin texture feature by the control module 3 in a third period following the second period, and then receives the control command of the control module 3 by the controlled module 4. The controlled module 4 is controlled by the control command of the control module 3, and the controlled module 4 performs a corresponding action.

To avoid unclear definitions of terms, the following first explains some terms used in the embodiments of the present invention.

In the present invention, the skin texture of a user refers to any skin texture formed by a skin ridge (SR) of a convex portion of the skin and a skin valley (SV) of a concave portion of the skin, that is, although the present invention mostly takes a fingerprint of a finger as an example, the fingerprint is not limited to the fingerprint of a finger or a toe, and all of them may serve as the skin texture referred to in the present invention as long as skin textures contain skin ridges and skin valleys.

In the present invention, the skin texture sampling data refers to image data after the skin texture of the user is directly sampled by the skin texture feature generating module 2 without performing image analysis (e.g.: ridge and valley detection, vector consistency, etc.), image processing (e.g.: noise removal, segmentation, smoothing, thinning, binarization, etc.), feature extraction and other processes. But it should be noted that the skin texture feature generating module 2 may also include a circuit for binary/multi-bit depth grayscale value conversion image processing, that is to say, the skin texture feature generating module 2 may directly obtain a binary/multi-bit depth grayscale value conversion image of the skin texture of the user after sampling the skin texture of the user without software-based computing.

In the present invention, the multi-bit depth grayscale value conversion image processing refers to converting the image data into an image formed by pixel points with multi-bit grayscale values. For example, an 8-bit grayscale value is taken as an example, the image data will be converted into 8-bit grayscale depth image data after 8-bit depth grayscale value conversion image processing, wherein the 8-bit grayscale depth image data is an image formed by pixel points with an 8-bit grayscale value range of 0-255 (black→white). An 8-bit grayscale depth is taken as an example in the present invention, but the present invention is not limited to the 8-bit grayscale depth, and further may perform multi-bit depth grayscale value conversion image processing of a grayscale depth of more than 8 bits (e.g., 16 bits, 32 bits, etc.) or less than 8 bits (e.g., 2 bits, 4 bits, etc.), so that the present invention is not limited to this.

In the present invention, the skin texture stripe data refers to data such as the length, spacing, number, pores, and clarity of skin texture stripes, generated by analyzing, for example, stripes formed by continuous skin ridges and continuous skin valleys after the skin texture feature generating module 2 samples the skin texture of the user.

In the present invention, the skin texture feature refers to skin texture feature data of the skin texture of the user, generated by the generated skin texture stripe data, or skin texture feature data of the skin texture of the user, generated by a feature generating unit according to multi-bit grayscale depth image data, for example, a first pixel number greater than a first grayscale threshold or a second pixel number less than a second grayscale threshold. The skin texture feature includes a fingertip portion of a fingerprint, a side portion of the fingerprint, a finger pulp portion of the fingerprint, a skin texture size, and a skin texture deflection.

In this embodiment, a working state of the skin texture control system 1 provided by the present invention includes a standby period and the working period. The standby period refers to the working state that the skin texture feature generating module 2 of the skin texture control system 1 has not sensed the skin texture of the user yet, and the skin texture of the user is waited to touch the skin texture feature generating module 2; and after it is sensed that the skin texture of the user touches the skin texture feature generating module 2, the working state will be changed into the working period. The working period refers to the working state that after the skin texture feature generating module 2 of the skin texture control system 1 senses that the skin texture of the user touches the skin texture feature generating module 2, the control module 3 receives the skin texture feature and outputs the control command corresponding to the skin texture feature. In order to more clearly describe the difference between the skin texture control system 1 provided by the present invention and the prior art, it is defined here that as described in the prior art, a working state for pre-establishing and storing fingerprint data (i.e., pre-established fingerprint data) of users is an A period, and a working state for comparing the fingerprint data with fingerprint data of a fingerprint pressed by the current user after the fingerprint data of the users is established is a B period. However, the working state of the skin texture control system 1 provided by the present invention does not include the A period and the B period, that is to say, in the working period of the skin texture control system 1 provided by the present invention, the first period, the second period, and the third period are following periods, and there is no need to pre-establish and store the skin texture data of the users and no need to compare the skin texture data with the pre-established and stored skin texture data of the users in the working period.

In this embodiment, the skin texture feature generating module 2 included in the skin texture control system 1 provided by the present invention is a module for generating the skin texture feature of the skin texture of the user in the working period, and includes a sampling unit 21 (alternatively, may also be referred to as a skin texture sampling device) and a feature generating unit 22. The sampling unit 21 is configured for sampling the skin texture of the user and generating the skin texture sampling data in the first period of the working period. The feature generating unit 22 is configured for generating the skin texture stripe data according to the skin texture sampling data, and then generating the skin texture feature of the skin texture of the user by the skin texture stripe data in the second period following the first period.

The sampling unit 21 includes a plurality of sensing pixels for sampling the skin texture of the user and generating the skin texture sampling data in the first period of the working period. A sampling way may be, for example, a way of sampling the skin texture of the user by a capacitive sensor, an optical sensor, an ultrasonic sensor, etc. The listed types of the sampling unit 21 are only examples, the sampling unit 21 is not limited to the listed types of the sensors, and all skin texture sampling devices with the same function may serve as the sampling unit 21 included in the skin texture control system 1.

The feature generating unit 22 is configured for generating the skin texture stripe data according to the skin texture sampling data, and then generating the skin texture feature of the skin texture of the user by the skin texture stripe data in the second period following the first period. The feature generating unit 22 may be a device with processing and computing capabilities, such as an application specific integrated circuit (ASIC), a processor, a single-chip microcomputer (MCU), etc. The listed types of the feature generating unit 22 are only examples, the feature generating unit 22 is not limited to the listed types of the analysis devices, and all devices with the same function may be the feature generating unit 22 included in the skin texture control system 1.

The following, for the way of generating the skin texture sampling data, the skin texture stripe data, and the skin texture feature by the skin texture feature generating module 2, further takes the sampling of the fingerprint of the finger as an example for combined description.

When the finger of the user touches the sampling unit 21, the sampling unit 21 will generate an electronic signal, and the skin texture sampling data is generated according to the strength of the signal generated by the sampling unit 21, wherein the generated skin texture sampling data may be converted into multi-bit grayscale depth image data by the feature generating unit 22 through multi-bit depth grayscale value conversion image processing, alternatively, the skin texture sampling data may also be generated according to the strength of the signal generated by the sampling unit 21 and is converted into binary grayscale depth image data directly through binary processing.

The binary processing is an image processing method for converting the skin texture sampling data into a black and white image of a binary grayscale depth image. For example, the skin texture sampling data may be converted into the multi-bit grayscale depth image data through the multi-bit depth grayscale value conversion image processing, and then converted into the black and white image of binary grayscale depth image (in another embodiment, the skin texture sampling data is directly sampled and converted into the black and white image of the binary grayscale depth image directly by the sampling unit without the multi-bit depth grayscale value conversion image processing), wherein the multi-bit grayscale depth image data takes the 8-bit grayscale depth (0-255) as an example, for example, a first grayscale threshold such as 150 may be set, so that a grayscale value (151-255) of sensing pixels, higher than the grayscale threshold (150), in the multi-bit grayscale depth image is converted to a binary grayscale value: 1 (white); moreover, a second grayscale threshold such as 100 may be set, so that a grayscale value (0-99) of sensing pixels, lower than the second grayscale threshold (100), in the multi-bit grayscale depth image is converted into a binary grayscale value: 0 (black); and the multi-bit grayscale depth image is converted into the black and white image of the binary grayscale depth image. Although in this example, the first grayscale threshold and the second grayscale threshold are set to be different, the first grayscale threshold and the second grayscale threshold may also be set to be same, that is to say, only one grayscale threshold may be set, which is not limited here by the present invention.

After the image is subjected to binary processing, the binary image may be further subjected to thinning. The thinning refers to an image processing method for continuously reducing the width of fingerprint lines on the binary image when the integrity and continuity of the fingerprint lines are retained.

Figure 2:
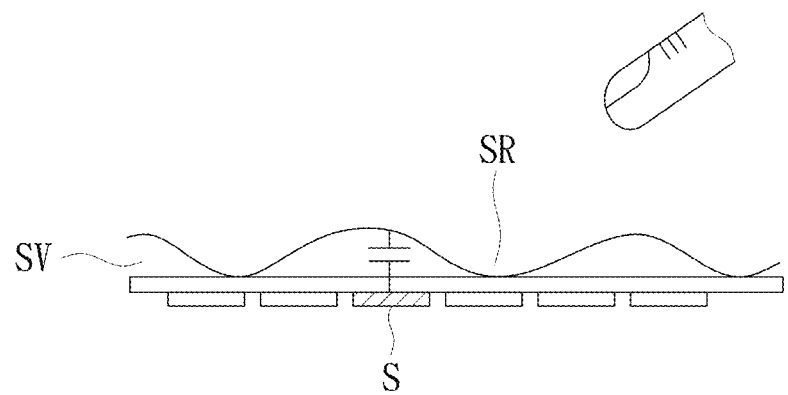
FIG. 2 is a schematic diagram of sampling a fingerprint of a finger by a capacitive sensor according to an embodiment of the present invention.

Referring to FIG. 2, the capacitive sensor and the 8-bit grayscale depth are taken as an example. A part where a returned signal S is stronger may be, for example, the skin ridge (SR) with stronger pressing force, and a part where the returned signal S is weaker may be, for example, the skin valley (SV) with weaker pressing force. The grayscale value in the 8-bit grayscale depth image data converted in correspondence to the returned signal may be 0→255 from weak to strong, or may be 255→0, and this part may be determined by, for example, circuit design or program design, which is not limited here by the present invention.

Next, the following makes a description for the way of generating the skin texture stripe data by the feature generating unit 22 according to the multi-bit grayscale depth image data.

Figure 3:
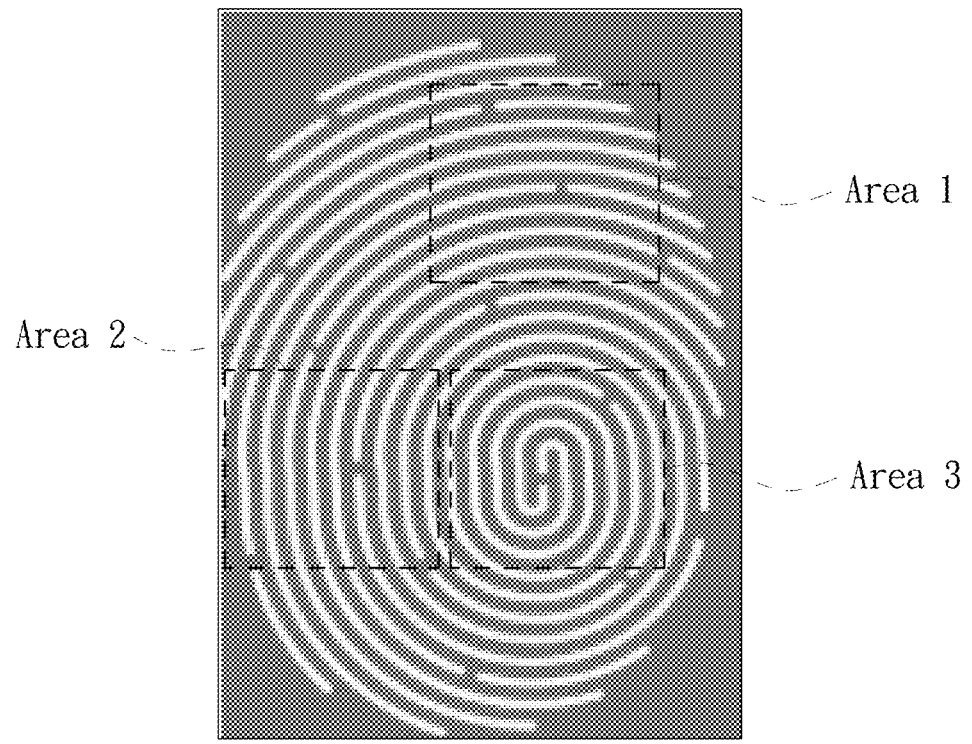
FIG. 3 is a schematic diagram of a fingerprint of a finger according to an embodiment of the present invention.

Refer to FIG. 3, which is a schematic diagram of a fingerprint of a finger of human, wherein a white line part is the skin ridge of the fingerprint. In the skin texture control system 1, when the finger of the user touches the texture feature generating module 2 by three different fingerprint areas, namely, an area 1 (Area 1), an area 2 (Area 2), and an area 3 (Area 3) as shown in FIG. 3, the sampling unit 21 will first sample the fingerprint of the user and generate the skin texture sampling data, and then the feature generating unit 22 will convert the skin texture sampling data into the multi-bit grayscale depth image data through the multi-bit depth grayscale value conversion image processing, then generate the skin texture stripe data according to the multi-bit grayscale value in the multi-bit grayscale depth image data, and then generate the skin texture feature of the fingerprint of the user by the skin texture stripe data. The skin texture feature generated in the area 1 is the fingertip portion of the fingerprint, the skin texture feature generated in the area 2 is the side portion of the fingerprint, and the skin texture feature generated in the area 3 is the finger pulp portion of the fingerprint.

Figure 4:
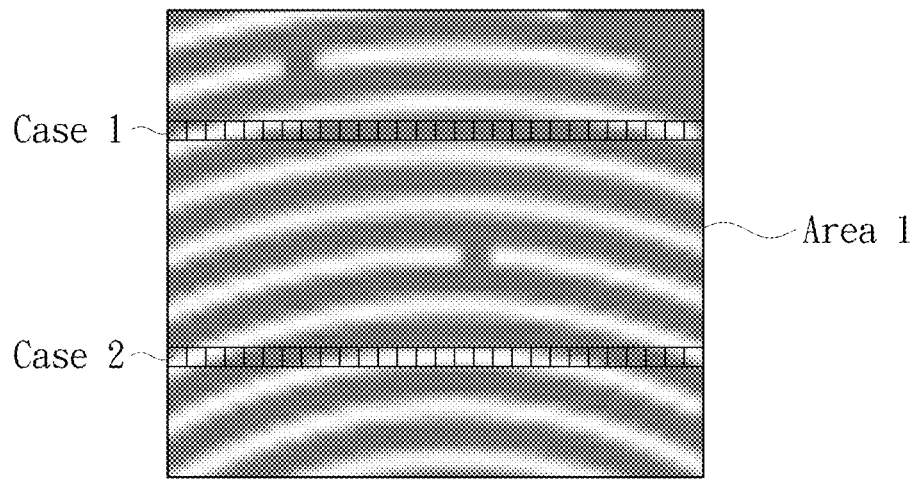
FIG. 4 is a schematic diagram of sampling a fingerprint area 1 of a finger according to an embodiment of the present invention.
Figure 5:
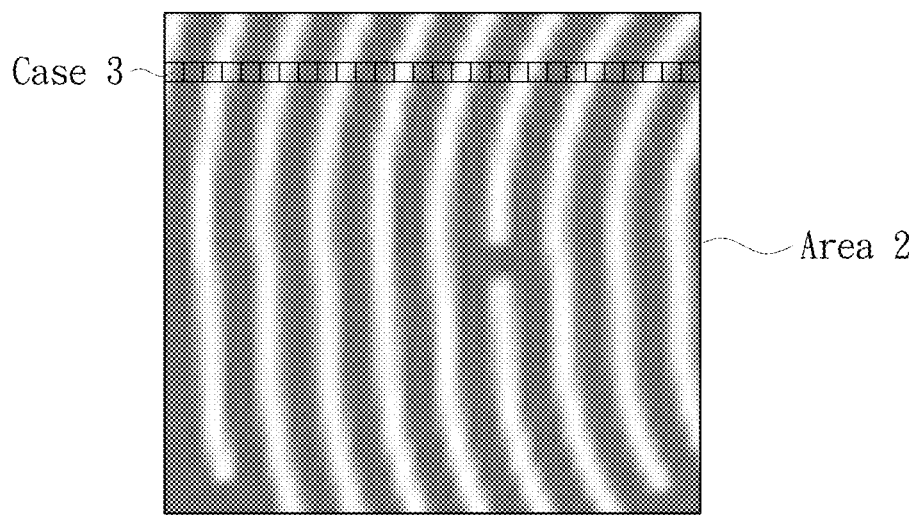
FIG. 5 is a schematic diagram of sampling a fingerprint area 2 of a finger according to an embodiment of the present invention.

Referring to FIG. 4 and FIG. 5, FIG. 4 and FIG. 5 are schematic diagrams of sampling a fingerprint of a finger of a user by using a sampling unit 21 with a line of 28 sensing pixels in total.

Referring to FIG. 4, in this embodiment, the sampling unit 21 (the skin texture sampling device) of the skin texture control system 1 includes: a first sensing pixel line of which a plurality of sensing pixels are arranged along a first direction at equal intervals. In an example of FIG. 4, the sampling unit 21 samples the fingerprint of the finger of the user, and the image data is the 8-bit grayscale depth image data as an example. In this embodiment, the sampling unit 21 senses an area of case1 and converts it into the 8-bit grayscale depth image data, wherein sensing pixels of the 8-bit grayscale depth image data include, for example, 17 black dots (grayscale value of 0), 2 white dots (grayscale value of 255) and 9 gray dots (grayscale value between 1 and 254). Because fingerprint lines in the area 1 are closer to horizontal, a difference between the total number of black dots and the total number of white dots obtained during the sampling is larger, so it may be set that when the difference between the number of black dots and the number of white dots is greater than a black and white dot number difference threshold (such as 12, 17 (the number of black dots)-2 (the number of white dots)=15 (the difference between the number of black dots and the number of white dots), 15>12 (the black and white dot number difference threshold)), the generated skin texture feature is the fingertip portion of the fingerprint.

Alternatively, referring to FIG. 4 and FIG. 5 at the same time, in another embodiment, the skin texture feature generating module 2 senses areas of case2 and case3 in the fingerprint area 1 (Area1) and the fingerprint area 2 (Area2) respectively, directly obtains the binary grayscale depth image data, and then generates the skin texture feature with the first binary grayscale value and the second binary grayscale value in the binary grayscale depth image data.

In this example, the first binary grayscale value is defined as white, the second binary grayscale value is defined as black, and the data corresponding to the sensing pixels is as shown in the following table:

| Case2 | | | | |
|---|---|---|---|---|
| 1 | 2 | 3 | 4 | 9 |
| White | White | White | Black | ... Black |
| 10 | ... | 21 | 22 | ... 28 |
| White | ... | White | Black | ... White |

In an example of Case2, the sensing pixels 1-3, 10-21, 28 are white, and the sensing pixels 4-9, 22-27 are black, and according to the above table, it may be known that a number of conversion from black to white or from white to black is totally 4 (conversion points: 3→4, 9-10, 21→22, 27→28).

| Case3 | | | | | | |
|---|---|---|---|---|---|---|
| 1 | 2 | 3 | 4 | 5 | 6 | 7 |
| Black | Black | White | Black | Black | White | Black |
| 8 | 9 | 10 | 11 | 12 | 13 | 14 |
| Black | White | White | Black | Black | White | Black |
| 15 | 16 | 17 | 18 | 19 | 20 | 21 |
| Black | White | Black | Black | White | Black | Black |
| 22 | 23 | 24 | 25 | 26 | 27 | 28 |
| White | White | Black | Black | White | Black | Black |

In an example of Case3, according to the above table, it may be known that a number of conversion from black to white or from white to black is totally 16.

As shown in the examples of Case 2 and Case 3, the present invention may further set a conversion number threshold according to the number of conversion from black to white. When the number of conversion is lower than the threshold, the generated skin texture feature is the fingertip portion of the fingerprint. When the number of conversion is higher than the threshold, the generated skin texture feature is the side portion of the fingerprint.

From the above, in this embodiment, the sampling unit 21 (the skin texture sampling device) includes: a first sensing pixel line of which a plurality of sensing pixels are arranged along the first direction at equal intervals. Under such arrangement, the skin texture feature of the fingertip portion of the fingerprint and the side portion of the fingerprint may be generated. Compared with the arrangement of the sensing pixels in the form of the array sensing area, the arrangement of this embodiment generates the skin texture feature of the user by fewer sensing pixels, and due to the smaller number of sensing pixels, it further achieves the technical effects of reducing the cost and the computational burden of the system, making the system operate faster, consuming less power, and requiring less memory.

Alternatively, the sampling unit 21 with the array sensing pixels may be used to know the ridge and valley distribution of the skin ridge and the skin valley in the fingerprint according to the multi-bit grayscale value in the multi-bit grayscale depth image data, and thus the skin texture feature generating module 2 may generate the skin texture stripe data of the fingerprint, such as the length, spacing, number, pores, and clarity of skin texture stripes.

Figure 6:
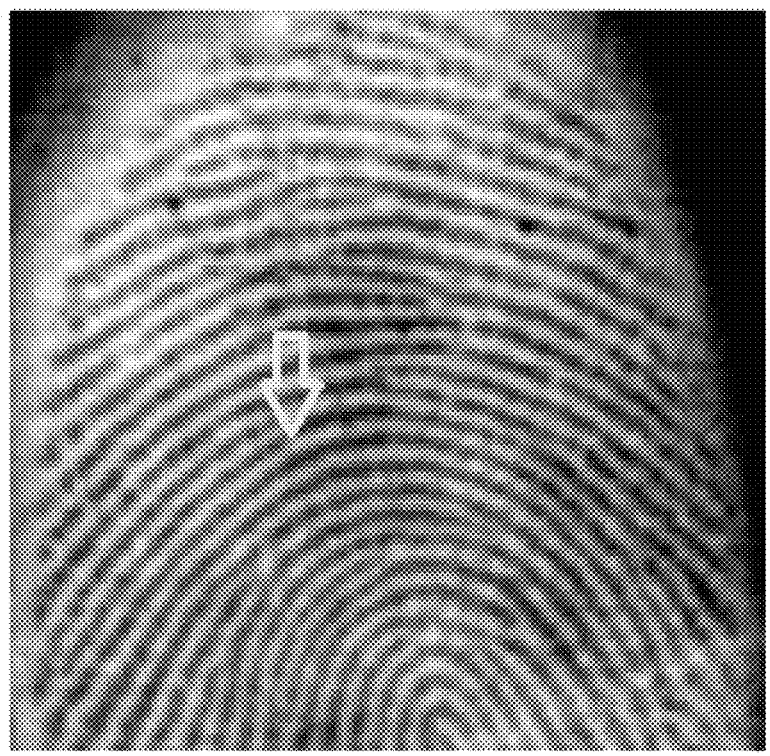
FIG. 6 is a schematic diagram of fingerprint image data of an adult according to an embodiment of the present invention.

The length of the skin texture stripes refers to that in the multi-bit grayscale depth image data, along a horizontal direction, a vertical direction or any angle direction, when the grayscale value in the grayscale value image data is greater than the first grayscale threshold, a part sensed by the sensing pixels of the grayscale value is judged to be the skin ridge of the fingerprint, the number of continuous skin ridges in the grayscale value image data is calculated, and the length of the skin texture stripes is generated according to the pitch of the sensing pixels of the sampling unit 21. In one of embodiments, referring to FIG. 6, an image of FIG. 6 is that fingerprint image data of an adult, with length*width being 640*480 pixels, is obtained by the skin texture feature generating module 2, and the size of a sensing unit is 75 um*75 um. By taking the skin ridge of the fingerprint pointed by an arrow as an example, the skin ridge of the fingerprint has 335 continuous pixels judged to be the skin ridge of the fingerprint in FIG. 6, so that the length of the skin ridge of the fingerprint that may be generated is 75 um*335=25.125 mm. In yet another embodiment, the skin texture stripes of an adult are longer, the length of the skin texture stripes of a child are only about half the length of the skin texture stripes of an adult, so that a first skin texture stripe length threshold and a second skin texture stripe length threshold may be set. When the length of the skin texture stripes is greater than the first skin texture stripe length threshold, the skin texture with the skin texture feature being big is generated, and then the fingerprint of the user is judged to be the fingerprint of the "adult". When the length of the skin texture stripes is less than the second skin texture stripe length threshold, the skin texture with the skin texture feature being small is generated, and then the fingerprint of the user is judged to be the fingerprint of the "child". Although in this example, the first skin texture stripe length threshold and the second skin texture stripe length threshold may be set to be different, the first skin texture stripe length threshold and the second skin texture stripe length threshold may also be set to be same, that is to say, only one skin texture stripe length threshold may be set, which is not limited here by the present invention.

The spacing of the skin texture stripes refers to a distance between two adjacent skin ridges or two adjacent skin valleys. For example, in the multi-bit grayscale depth image data, along the horizontal direction, the vertical direction or any angle direction, when the grayscale value in the grayscale value image data is greater than the first grayscale threshold, the part sensed by the sensing pixels of the grayscale value is judged to be the skin ridge of the fingerprint; when the grayscale value in the grayscale value image data is less than the second grayscale threshold, a part sensed by the sensing pixels of the grayscale value is judged to be the skin valley of the fingerprint; and according to the ridge and valley distribution of the skin ridge and the skin valley in the multi-bit grayscale depth image data, a distance between the skin ridges (or the skin valleys) of each pixel is calculated, and a minimum value of the distance is taken as the spacing of the skin texture stripes, alternatively, all distances may be averaged to serve as the spacing of the skin texture stripes.

Figure 7:
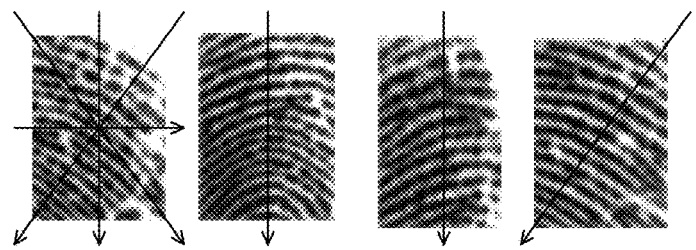
FIG. 7 is a schematic diagram of calculating the number of skin texture stripes according to an embodiment of the present invention.
Figure 7:
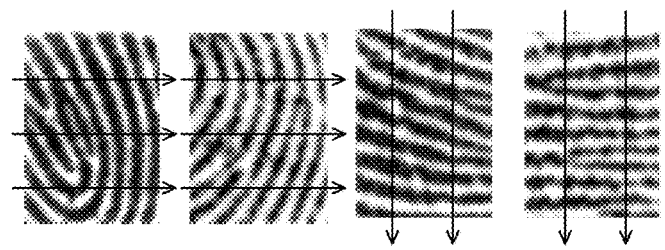

Referring to FIG. 7, the number of the skin texture stripes refers to the total number of skin texture stripes in the grayscale image data. In FIG. 7, by the sampling unit 21 (a sensing size of each sensing pixel is 50 um*50 um) with the **80*60** array sensing area, a small area of a skin texture sensing area is sampled, and along the horizontal direction, the vertical direction or any angle direction, a first grayscale threshold is taken as a boundary. When the grayscale value in the converted grayscale value image data is across the first grayscale threshold (that is, the grayscale value in the grayscale value image data is changed to being higher than the first grayscale threshold from being lower than the first grayscale threshold, or is changed to being lower than the first grayscale threshold from being higher than the first grayscale threshold), the number of skin texture stripes is calculated cumulatively to calculate the total number of skin texture stripes in the grayscale value image data.

Figure 8:
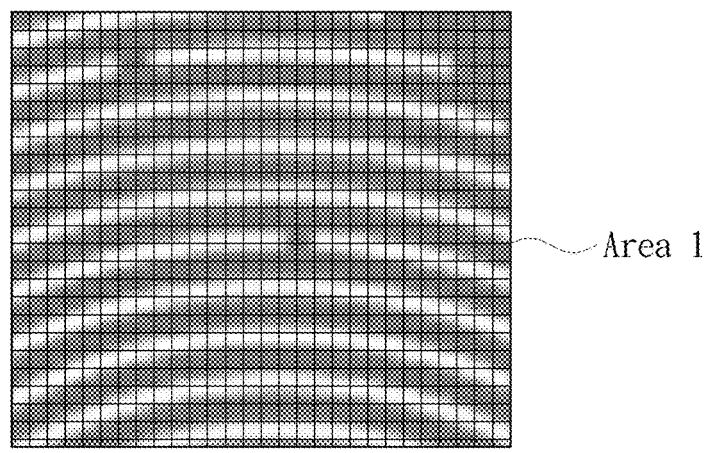
FIG. 8 is a schematic diagram of sampling a fingerprint area 1 of a finger according to another embodiment of the present invention.
Figure 9:
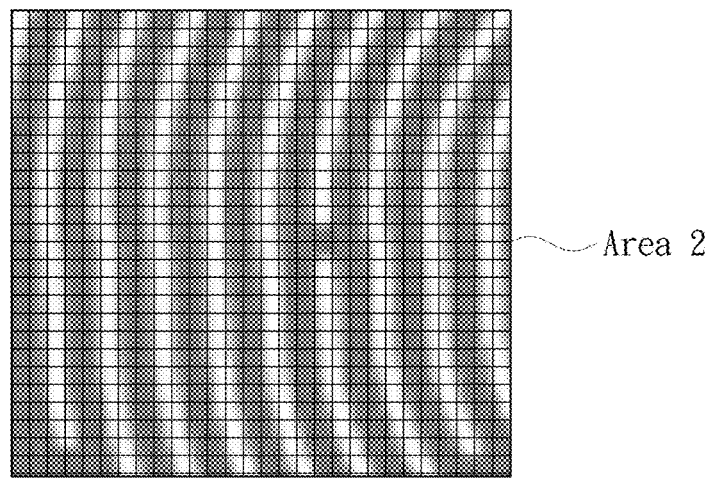
FIG. 9 is a schematic diagram of sampling a fingerprint area 2 of a finger according to another embodiment of the present invention.
Figure 10:
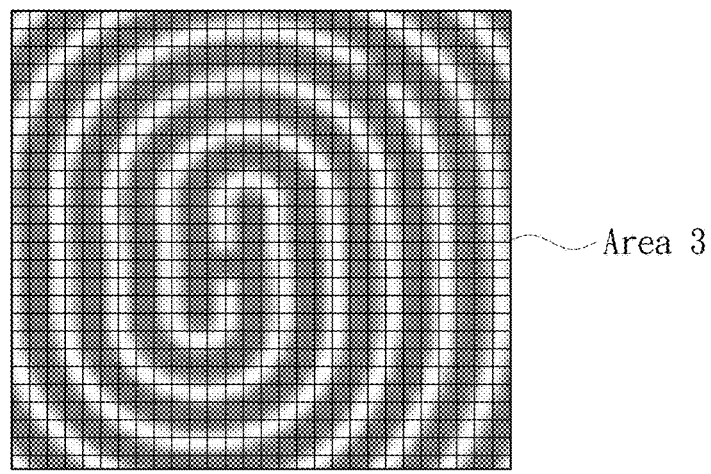
FIG. 10 is a schematic diagram of sampling a fingerprint area 3 of a finger according to another embodiment of the present invention.

Refer to FIG. 8, FIG. 9, and FIG. 10, which are schematic diagrams of respectively sampling an area 1 (Area 1), an area 2 (Area 2), and an area 3 (Area 3) of a fingerprint by using a skin texture feature generating module 2 with an array sensing area (a total of 28*28 sensing pixels in this example).

In this embodiment, an example of the method for generating the skin texture feature of the fingerprint is as follows: the skin texture feature generating module 2 senses an overall area of FIG. 8, FIG. 9, and FIG. 10, converts it into a multi-bit depth grayscale value array and then performs binary processing (judging it to be black or white) on the array; and next, in an X-axis direction, the frequencies of conversion of "black→white" or "white→black" in the 1st to 28th columns are calculated, and the frequencies of conversion of "black→white" or "white→black" in the 1st to 28th columns are added up.

According to the number of black and white conversion, the present invention may set a first black and white conversion number threshold (for example, 6 (set according to requirements)*28 (the number of a column of sensing pixels)=168 (the first black and white conversion number threshold)), and when the number of black and white conversion is lower than the first black and white conversion number threshold, the generated skin texture feature is the fingertip portion of the fingerprint; the present invention may set a second black and white conversion number threshold (for example, 14 (set according to requirements) *28 (the number of a column of sensing pixels)=392 (the second black and white conversion number threshold)), and when the number of black and white conversion is higher than the second black and white conversion number threshold, the generated skin texture feature is the side portion of the fingerprint; and when the number of black and white conversion is between the first black and white conversion number threshold and the second black and white conversion number threshold, the generated skin texture feature is the finger pulp portion of the fingerprint.

In one of embodiments, in order to improve the sampling quality of the fingerprint, a third black and white conversion number threshold (the third black and white conversion number threshold is greater than the first black and white conversion number threshold) and a fourth black and white conversion number threshold (the fourth black and white conversion number threshold is less than the second black and white conversion number threshold) are further set. When the number of black and white conversion is between the third black and white conversion number threshold and the fourth black and white conversion number threshold, the generated skin texture feature is the finger pulp portion of the fingerprint. When the number of black and white conversion is between the first black and white conversion number threshold and the third black and white conversion number threshold, or between the second black and white conversion number threshold and the fourth black and white conversion number threshold, the user is required to press the fingerprint again for sampling.

In this embodiment, the skin texture feature of the fingerprint of the user is generated by the shape and direction of the fingerprint lines. If the user deflects the finger by 900 and touches the skin texture feature generating module 2 by the fingerprint area 1 for sampling (that is, the fingerprint changes from horizontal stripes to straight stripes), the skin texture feature of the fingerprint will be generated as the side portion (the fingerprint area 2) of the fingerprint, that is to say, even if the skin texture feature generating module 2 is touched by the fingertip of the finger for sampling, different skin texture features may be generated by changing a pressing direction for different control. For example, in one of embodiments, the skin texture control system 1 further includes a controlled module 4 (for example, a Bluetooth headset is taken as the controlled module 4, but the present invention is not limited here) with a volume adjustment circuit, and the control command includes performing a volume adjustment through the volume adjustment circuit of the controlled module 4. For example, when the generated skin texture feature is the fingertip portion (the fingerprint area 1) of the fingerprint, the volume of the controlled module 4 is increased through the volume adjustment circuit of the controlled module 4. For example, when the generated skin texture feature is the side portion (the fingerprint area 2) of the fingerprint, the volume of the controlled module 4 is reduced through the volume adjustment circuit of the controlled module.

Figure 11:
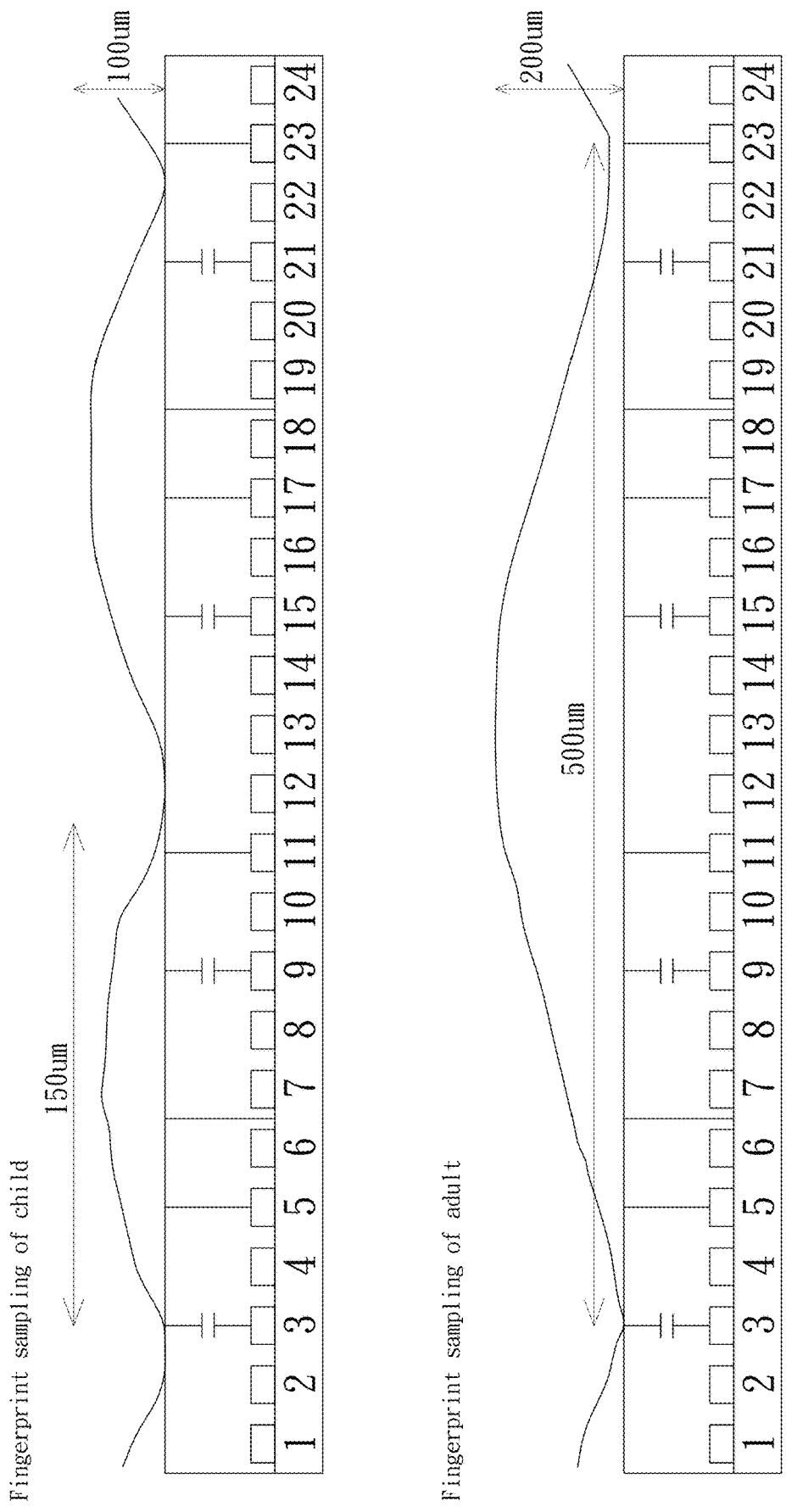
FIG. 11 is a schematic diagram of fingerprint sampling and comparison of a child and an adult according to an embodiment of the present invention.
Figure 12:
FIG. 12, FIG. 13 and FIG. 14 are schematic diagrams of sampling image data of a child and an adult according to an embodiment of the present invention.
Figure 13:
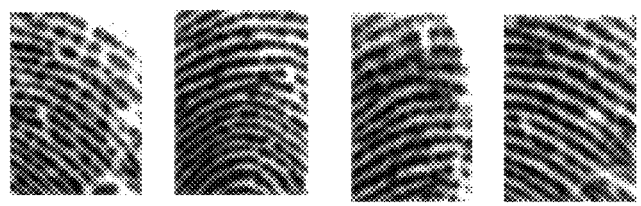
Figure 13:
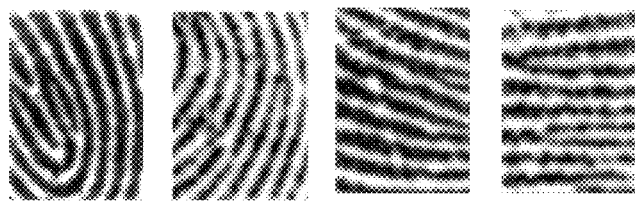

Referring to FIG. 11, FIG. 12 and FIG. 13, the clarity of skin texture stripes refers to a difference between a maximum grayscale value and a minimum grayscale value of pixels in the multi-bit grayscale depth image data.

FIG. 11 is a schematic diagram of fingerprint sampling and comparison of a child and an adult. As children grow into adults, the line distribution of fingerprints does not change, but when the fingerprint of the user is sampled by using the skin texture feature generating module 2, The clarity of the fingerprint will be different due to the difference in the distance between the skin valley and the sampling unit 21, resulting in different clarity of the sampled data. In one of embodiments, the distance between the skin valley of the child and the sampling unit 21 is about 100 um, and the distance between the skin valley of the adult and the sampling unit 21 is about 200 um. The distance between the skin ridges will also be increased with the growth of the body (the distance will be increased from about 150 um to about 500 um), which makes the clarity of the sampled and converted multi-bit depth image data differently. The actual sampled data is as shown in FIG. 12 and FIG. 13.

Referring to FIG. 12, FIG. 12 is a schematic diagram of multi-bit grayscale depth image data sampled by using a sampling unit 21 with a lower resolution, wherein a whiter part is the skin ridge (the grayscale value is greater than the first grayscale threshold), and a blacker part is the skin valley (the gray value is less than the second gray value threshold). It may be seen from FIG. 7 that when a sensor with a lower resolution is used, a clear fingerprint image of the child may not be obtained, that is to say, a difference value between a maximum grayscale value and a minimum grayscale value of the obtained image is smaller.

From the above, the present invention may, according to this characteristic, distinguish the fingerprint of the user who currently touches the skin texture feature generating module 2 is the fingerprint of a "child" or a "adult", or distinguish the fingerprint of the little finger or the big fingerprint of a same person (for example, the fingerprint of the big toe or the fingerprint of the thumb of the finger), and is used in different applications without recording the fingerprint data and without comparing the fingerprint image data. For example, it may be used as a safety switch for items with safety requirements, such as an electric iron, an electronic cigarette, a TV remote control and other items that are not suitable for the child to use. According to this characteristic, the items may be restricted to an adult only. It may also be used as a diary privacy security lock of a child. When the items are restricted to a child only, an adult may not spy on a diary of a child, thereby protecting the privacy security. Alternatively, it may be configured for preventing an adult from using a baby motorcycle and the like.

Figure 14:
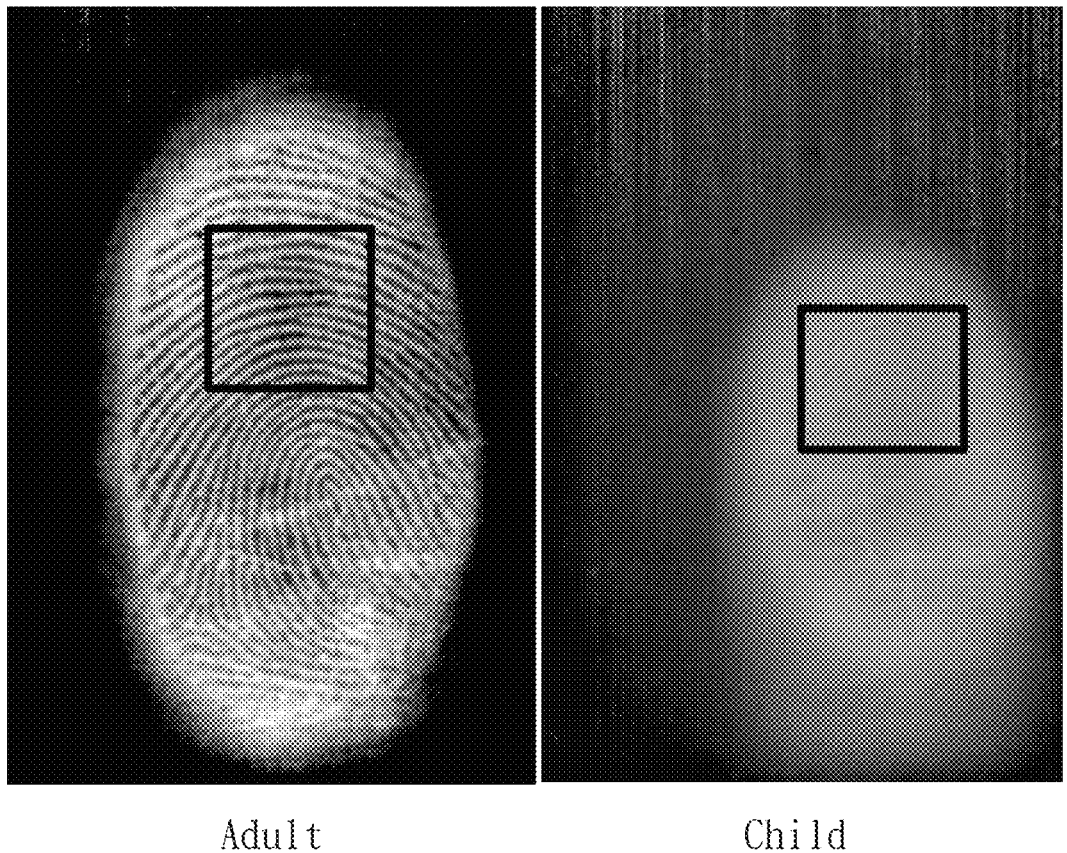
Figure 15:
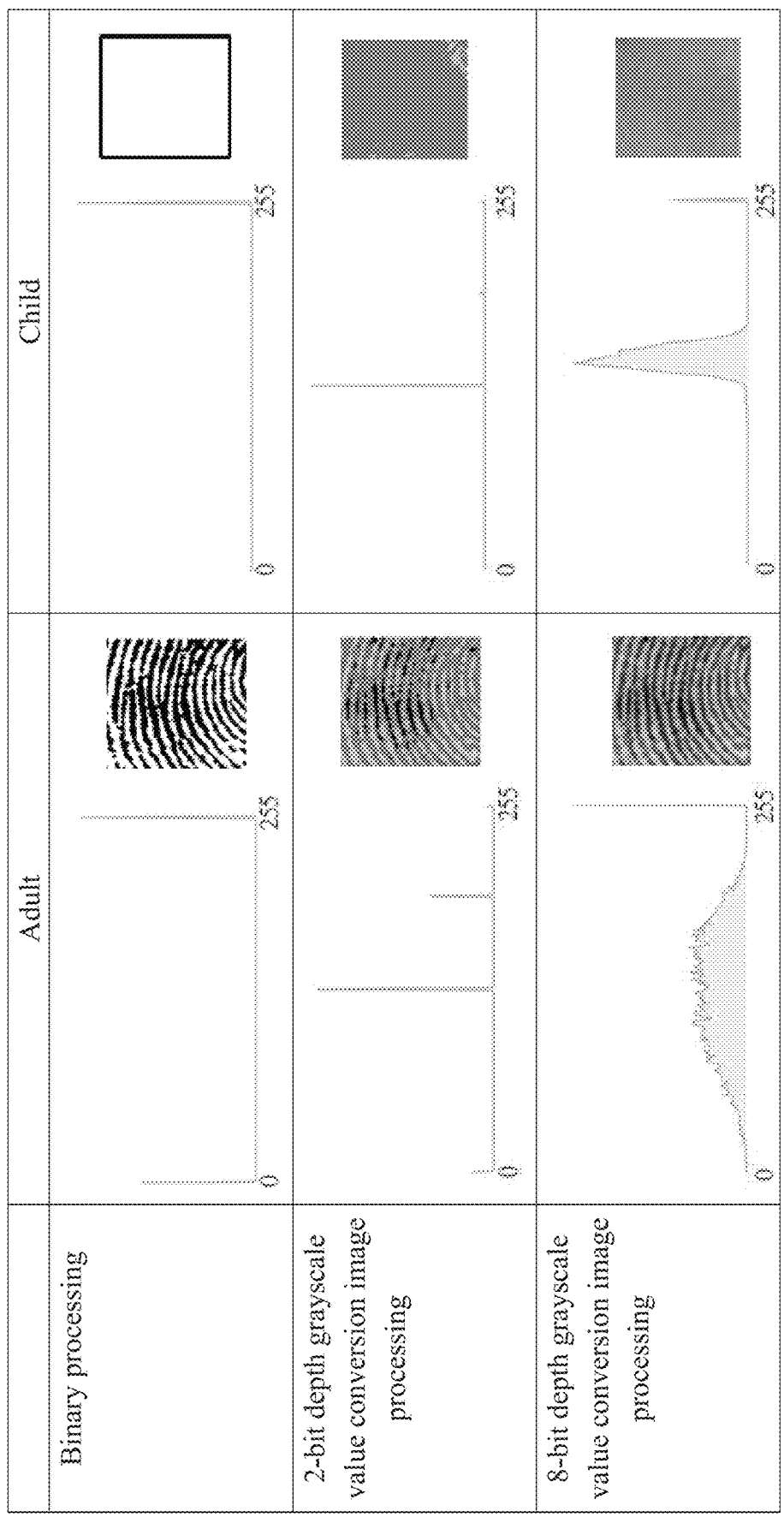
FIG. 15 is a histogram of grayscale values of fingerprint images of a child and an adult after image processing according to an embodiment of the present invention.

Referring to FIG. 15, FIG. 15 is a schematic diagram of performing 8-bit and 2-bit grayscale value image processing and binary image processing on multi-bit grayscale depth image data of a boxed area in FIG. 14, and performing histogram of grayscale values of pixels in the image data.

In FIG. 15, a left side of each piece of the image data is respectively provided with a histogram of the grayscale value of 0-255 after binary, 2-bit and 8-bit grayscale value image processing, wherein a horizontal axis is the grayscale value, and a vertical axis is the total pixel number corresponding to the grayscale value. After binary processing, the number of black dots (grayscale value of 0) in the fingerprint image data of the child is smaller (the number is 0 in this example), so that the first pixel number of the first grayscale threshold may be set as a basis to generate the skin texture with the skin texture feature being small or big, and then the fingerprint of the user is judged to be the fingerprint of the "child" or "adult". For example, the first pixel number of a first grayscale threshold (grayscale value of 0) may be set to be ⅓ of the number of sensing pixels of the sampling unit 21 (for example, the number of sensing pixels is 30 (row) *30 (column)=900 (total), and at this time, the first pixel number of the first grayscale threshold is 900*⅓=300). When the number of black pixels (grayscale value of 0) exceeds 300 (threshold), the fingerprint of the user is judged to be the fingerprint of the "adult". Alternatively, a black and white dot number difference threshold may be set. After binary processing, the grayscale value in the fingerprint image of the child will be close to completely white (grayscale value of 255) or completely black (grayscale value of 0). When the difference between the number of black dots (grayscale value of 0) and the number of white dots (grayscale value of 255) is lower than the black and white dot number difference threshold, the skin texture with the skin texture feature being big is generated, and then the fingerprint of the user is judged to be the fingerprint of the "adult".

Figure 16:
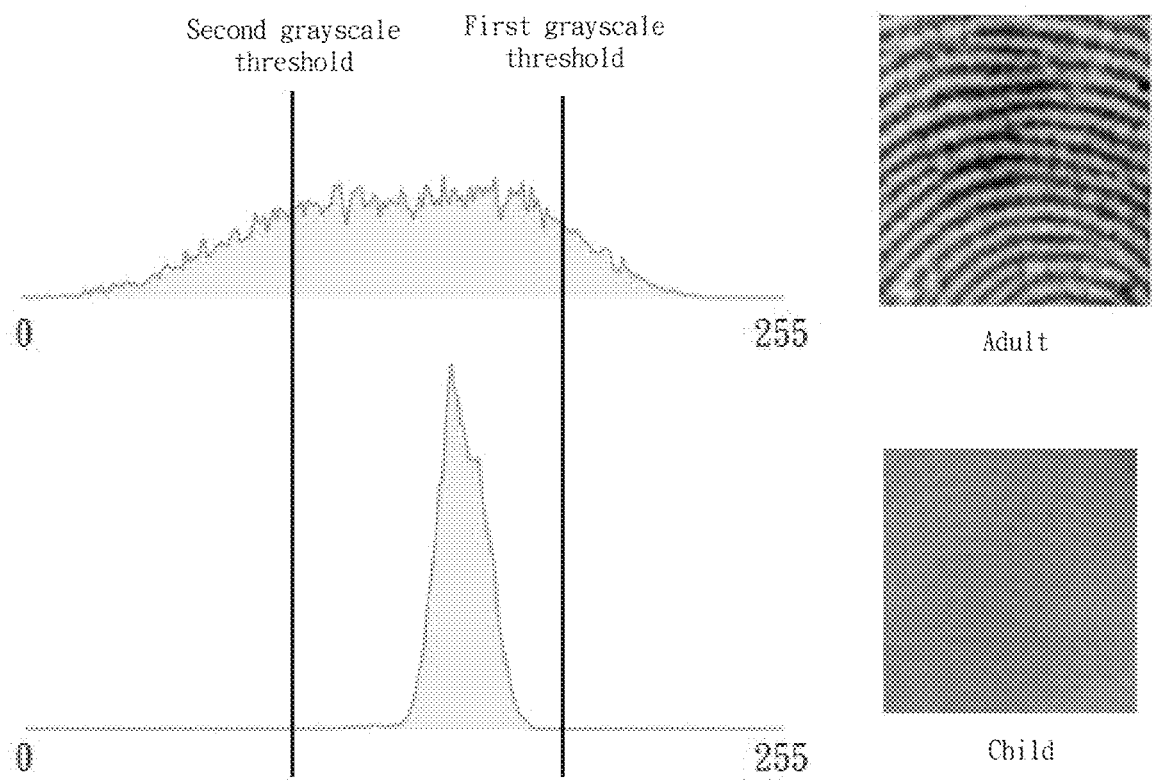
FIG. 16 is a schematic diagram of a first grayscale threshold and a second grayscale threshold according to an embodiment of the present invention.

Alternatively, referring to FIG. 16, in other embodiments, as shown in FIG. 16, in the multi-bit depth grayscale image data of the child, the first pixel number greater than the first grayscale threshold and the second pixel number less than the second grayscale threshold are almost 0, and the grayscale value of pixels are distribution between the first grayscale threshold and the second grayscale threshold, so that the feature generating unit 22 may, in the multi-bit grayscale depth image data, generate the skin texture with the skin texture feature being small or big with the first pixel number greater than the first grayscale threshold and the second pixel number less than the second grayscale threshold, and then the fingerprint of the user is judged to be the fingerprint of the "child" or "adult".

Figure 17:
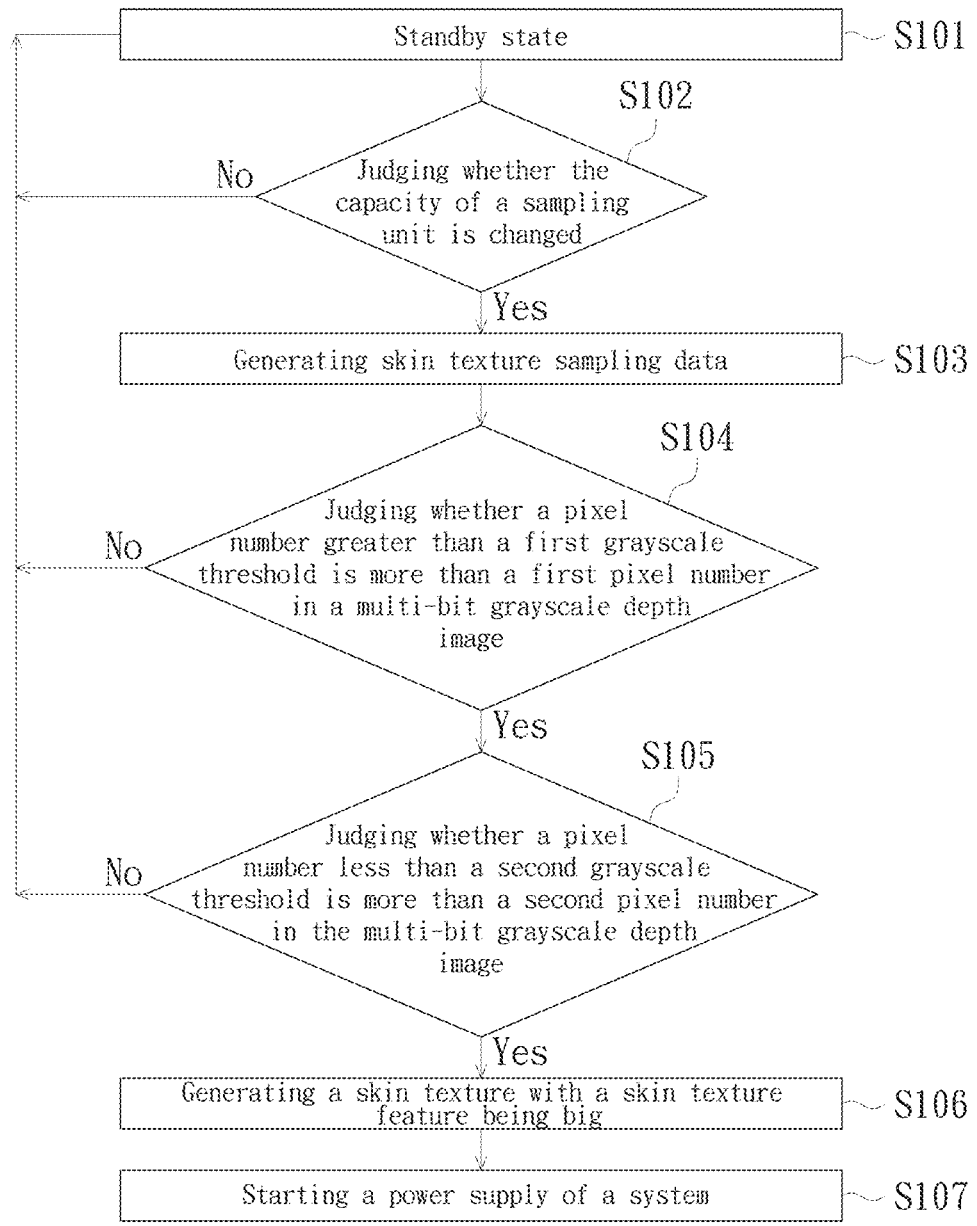
FIG. 17 is an operational flowchart of an electronic cigarette device according to an embodiment of the present invention.

Referring to FIG. 17, FIG. 17 is an operational flowchart of applying a method of FIG. 16 to an electronic cigarette device. In this embodiment, because the electronic cigarette device is an item that can only be used by adults, if it is used by children, it may harm the physical and mental health of children. In order to prevent children from using the electronic cigarette device, this embodiment applies the present invention to the electronic cigarette device, and then prohibits children from using the electronic cigarette device, so as to protect the physical and mental health of children.

As in step S101, the electronic cigarette device applies the skin texture control system 1 provided by the present invention, and enters a standby state at an initial stage of system startup.

As in step S102, the electronic cigarette device judges whether the capacity of the sampling unit 21 is changed in a polling manner. If the capacity is not changed, the electronic cigarette device will return the system to the standby state (i.e., return to step S101), and the system will proceed to step S103 until the capacity is changed.

As in step S103, when the capacity is changed, the system will judge that the user is using the system, that is, the user of the system is in a state of touching the sampling unit 21 by the skin texture. At this time, the sampling unit 21 will sample the skin texture of the user and generate the skin texture sampling data. After the skin texture sampling data is generated, the system proceeds to step S104.

As in step S104, the feature generating unit 22 calculates the total pixel number greater than the first grayscale threshold in the multi-bit grayscale depth image data, and judges whether the total pixel number greater than the first grayscale threshold is more than the first pixel number set by the system in the multi-bit grayscale depth image data. When a judgment result is "Yes", because the skin texture of the user conforms to the characteristics of the skin texture of the adult, the system proceeds to step S105; and when a judgment result is "No", because the skin texture of the user does not conform to the characteristics of the skin texture of the adult, the electronic cigarette device will return to the standby state (i.e., return to step S101), alternatively, the feature generating unit 22 may generate the skin texture (not shown in figure) with the skin texture feature being small (child), and make the system return to the standby state again (i.e., return to step S101).

As in step S105, the feature generating unit 22 further judges whether the total pixel number less than the second grayscale threshold is more than the second pixel number set by the system in the multi-bit grayscale depth image data. When a judgment result is "Yes", because the skin texture of the user conforms to the characteristics of the skin texture of the adult, the system proceeds to step S106; and when a judgment result is "No", because the skin texture of the user does not conform to the characteristics of the skin texture of the adult, the electronic cigarette device will return the system to the standby state (i.e., return to step S101), alternatively, the feature generating unit 22 may generate the skin texture (not shown in figure) with the skin texture feature being small (child), and make the system return to the standby state again (i.e., return to step S101).

As in step S106, the feature generating unit 22 generates the skin texture with the skin texture feature being big (adult), and the system proceeds to step S107.

As in step S107, the system starts a power supply and provides it for the adult user.

As described in the above steps S101 to S107, the present invention can be used as a safety switch in various devices suitable for adults only or children only, such as an electric iron, an electronic cigarette, a TV remote control and other items that are not suitable for the child to use. According to this characteristic, the items can be restricted to the adult only. Alternatively, the present invention may also be used as a diary privacy security lock of the child by using a similar structure. When the items are restricted to the child only, the adult may not spy on a diary of the child, thereby protecting the privacy security. Alternatively, it may be configured for preventing the adult from using a baby motorcycle and the like.

Figure 18:
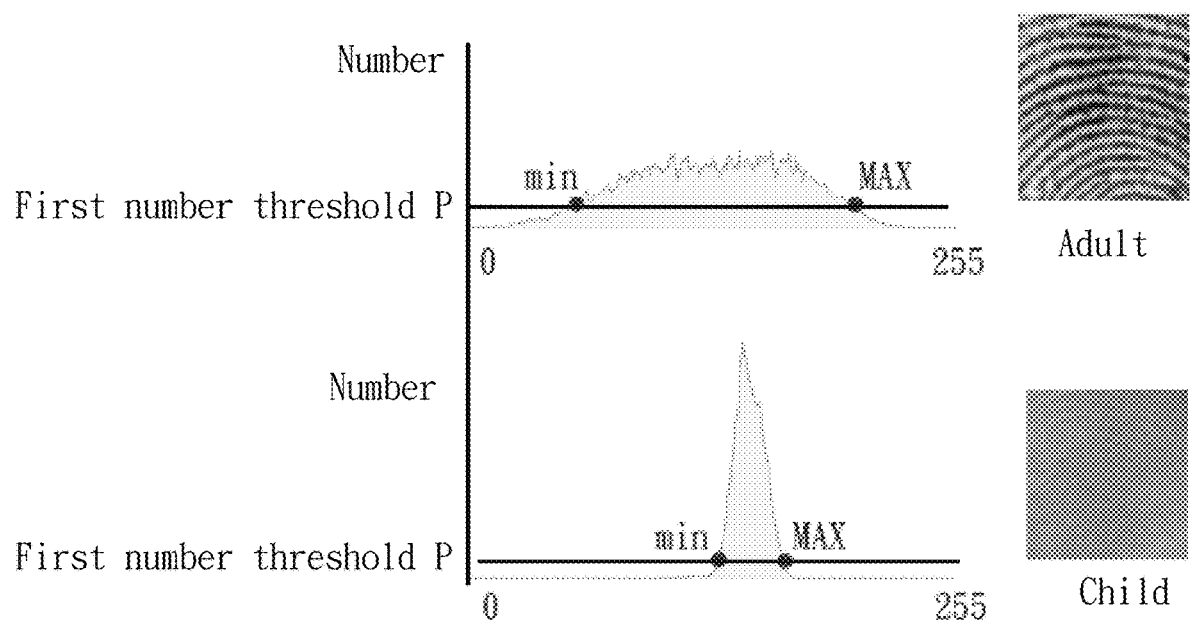
FIG. 18 is a schematic diagram of a threshold of the number of pixels with grayscale values according to an embodiment of the present invention.

Alternatively, referring to FIG. 18, a threshold of the number of pixels with grayscale values may be set in other embodiments. As shown in FIG. 18, a maximum value and a minimum value of the grayscale values higher than the threshold of the number of pixels with grayscale values may be obtained in the multi-bit depth grayscale value image data by the threshold of the number of pixels with grayscale values.

It may be seen from FIG. 18 that in the multi-bit grayscale depth image data of the adult, the difference between the maximum value and the minimum value of the grayscale values higher than the threshold of the number of pixels with grayscale values will be larger than that in the fingerprint image of the child. Therefore, the present invention may set another grayscale difference threshold, generate the skin texture with the skin texture feature being small or big by the grayscale difference threshold, and then judge the fingerprint of the user to be the fingerprint of the "adult" or "child".

For example, in the multi-bit grayscale depth image data with 80*60 pixels, the threshold of the number of pixels with grayscale values may be set to 30. In the 8-bit depth grayscale value image data converted from the fingerprint image of the adult, the number of pixels with the grayscale value of 211 is 32, and among the grayscale values of pixels with the number of more than 30, 211 is the maximum value; and, the number of pixels with the grayscale value of 50 is 31, and among the grayscale values of the pixels with the number of more than 30, 50 is the minimum value. In the 8-bit grayscale value depth image data converted from the fingerprint image of the child, the number of pixels with the grayscale value of 180 is 35, and among the grayscale values of pixels with the number of more than 30, 180 is the maximum value; and, the number of pixels with the grayscale value of 130 is 31, and among the grayscale values of the pixels with the number of more than 30, 130 is the minimum value. In this example, the difference between the grayscale values of the fingerprint image of the adult is 211−50=161, and the difference between the grayscale values of the fingerprint image of the child is 180−130=50. Therefore, the present invention may set the grayscale difference threshold to be, for example, 110. When the difference between the maximum value and the minimum value of the grayscale values is greater than 110, the skin texture with the skin texture feature being big is generated, and then the fingerprint of the user is judged to be the fingerprint of the "adult"; and when the difference between the maximum value and the minimum value of the grayscale values is less than 110, the skin texture with the skin texture feature being small is generated, and then the fingerprint of the user is judged to be the fingerprint of the "child".

Figure 19:
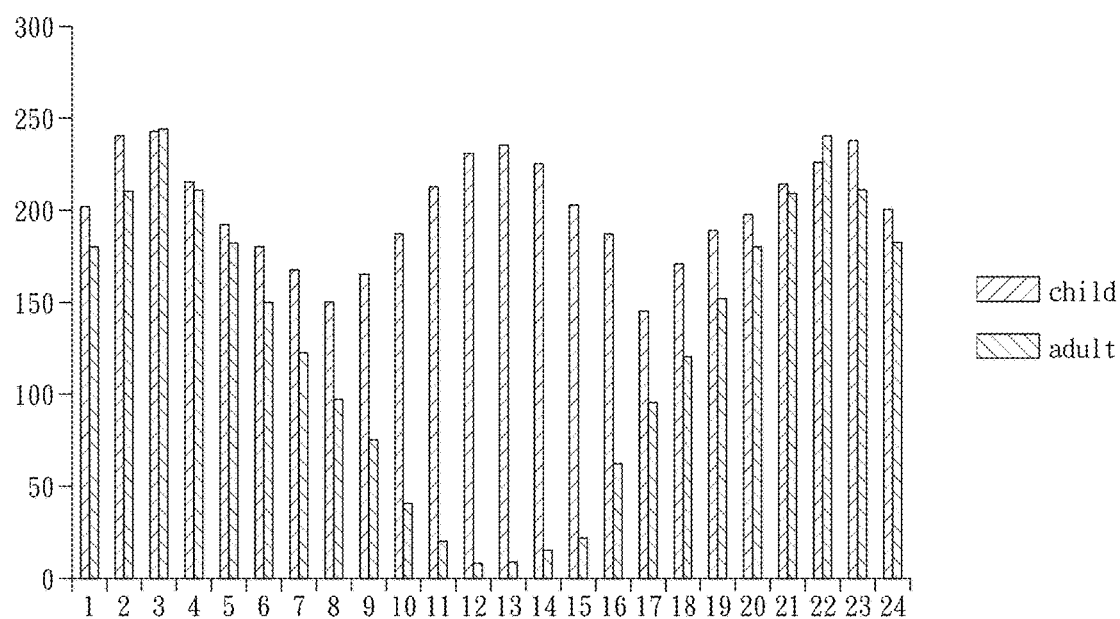
FIG. 19 and FIG. 20 are comparative diagrams of grayscale values of fingerprint images of a child and an adult according to an embodiment of the present invention.

Referring to FIG. 19, in another embodiment, as shown in the figure, in the fingerprint image of the child, the minimum value of the converted grayscale values is 145, and the maximum value thereof is 243, wherein the difference value is 243−145=98; and in the fingerprint image of the adult, the minimum value of the converted grayscale values is 8, and the maximum value thereof is 244, wherein the difference value is 244−8=236. Therefore, the present invention may set a grayscale difference threshold to generate the skin texture with the skin texture feature being small or big, and then judge the fingerprint of the user to be the fingerprint of the "child" or "adult". For example, the grayscale difference threshold is set to be 150. When the difference value between the converted grayscale values is 98, since 98<150, the skin texture with the skin texture feature being small is generated, and then the fingerprint of the user is judged to be the fingerprint of the "child"; and when the difference value between the converted grayscale values of the fingerprint data is 236, since 236>150, the skin texture with the skin texture feature being big is generated, and then the fingerprint of the user is judged to be the fingerprint of the "adult".

Figure 20:
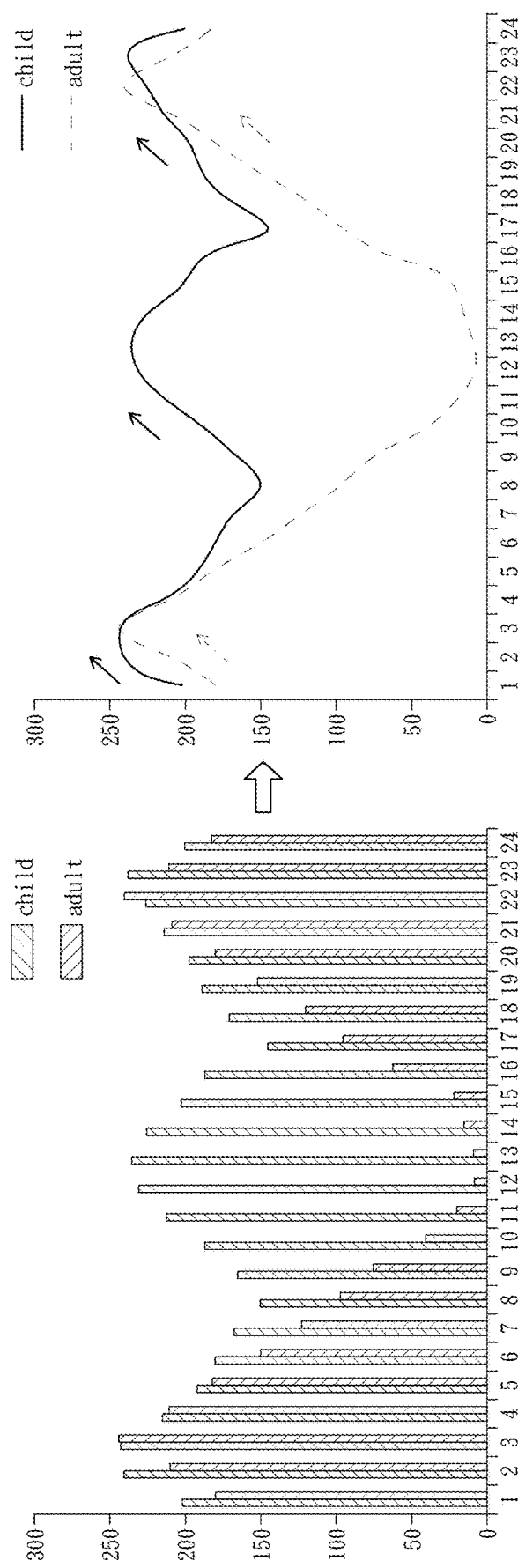

Alternatively, referring to FIG. 20, FIG. 20 is a curve graph formed by data of FIG. 19. It may be seen from FIG. 19 that under the same number of sensing pixels (the number is 24 in FIG. 19, and for example, a sensing size of each sensing pixel is 25 um*25 um) (that is, a total sensing distance), for a number of conversion of the grayscale values from high to low or from low to high, the number in the 8-bit depth grayscale value image data converted by the fingerprint of the child is 3, and the number in the 8-bit depth grayscale value image data converted by the fingerprint of the adult is 2, so that the number of conversion of the fingerprint of the child is higher than the number of conversion of the fingerprint of the adult. That is to say, by different distances between the skin ridges or between the skin valleys, the skin texture with the skin texture feature being small or big may be generated, and then the fingerprint of the user is judged to be the fingerprint of the "child" or "adult".

Figure 21:
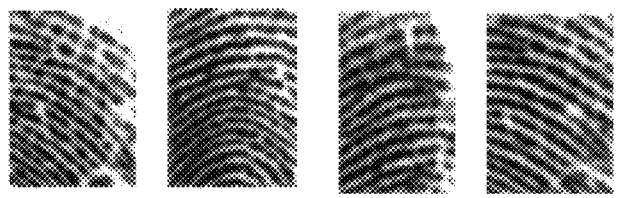
FIG. 21 is a schematic diagram of fingerprint sampling image data according to an embodiment of the present invention.
Figure 21:
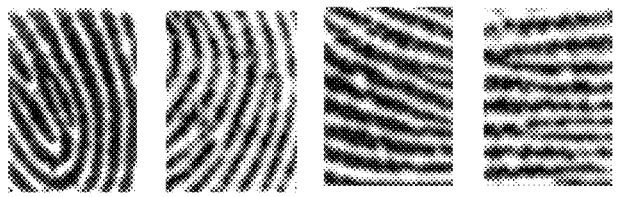
Figure 22:
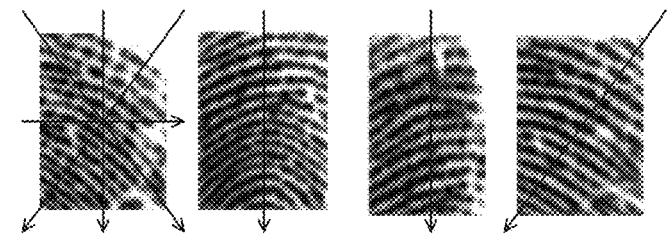
FIG. 22 is a schematic diagram of calculating the direction of skin texture stripes according to an embodiment of the present invention.
Figure 22:
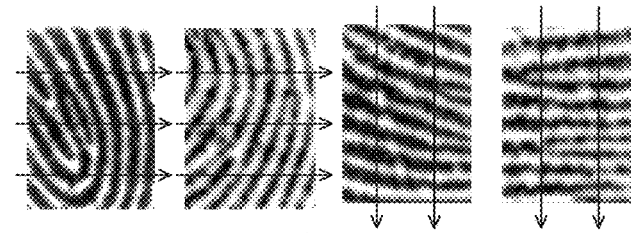
Figure 23:
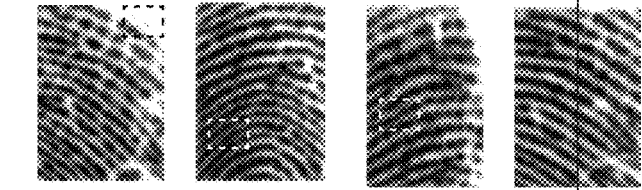
FIG. 23 is a schematic diagram of poorly captured fingerprint sampling images according to an embodiment of the present invention.
Figure 23:
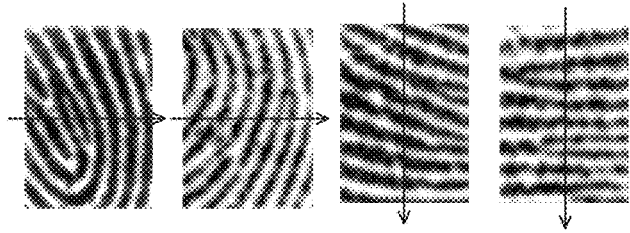

Refer to FIG. 21, FIG. 22, and FIG. 23. FIG. 21 is that the present invention, in one of embodiments, obtains fingerprint image data with length*width being 80*60 pixels by a high-resolution skin texture feature generating module 2. The size of a sensing pixel is 50*50 um.

In this embodiment, the number of conversion of "black→white" or "white→black" may be calculated, for example, in a Y-axis direction (the total length is 80*50 um=4 mm) by the above method to obtain the number of fingerprint lines (the number of skin ridges or skin valleys contained in the fingerprint image data), the skin texture with the skin texture feature being small or big is generated, and then the fingerprint of the user is judged to be the fingerprint of the "child" or "adult".

For example, as shown in FIG. 22, the number of fingerprint lines of the child obtained in this embodiment is about 13-14, and the number of fingerprint lines of the adult is about 7-8. Therefore, by a difference between the number of fingerprint lines of the child and the number of fingerprint lines of the adult, a line number threshold may be set to generate the skin texture with the skin texture feature being small or big, and then the fingerprint of the user is judged to be the fingerprint of the "child" or "adult".

In this embodiment, because the direction in which the user presses the fingerprint is not fixed, the line number threshold must be set with reference to the number of fingerprint lines in the fingerprint image calculated in various directions (for example: an X axis, a Y axis, a diagonal direction or any direction in plane coordinates).

Referring to FIG. 22, in the fingerprint image data of FIG. 22, the total length in the X-axis direction is 60*50 um=3 mm; the total length in the Y-axis direction is 80*50 um=4 mm; the total length in the diagonal direction is 100*50 um=5 mm. In this example, by calculating the number of conversion of "black→white" or "white→black", the number of fingerprint lines of the child obtained in the X-axis direction is about 10, and the number of fingerprint lines of the adult is about 5-6; the number of fingerprint lines of the child obtained in the Y-axis direction is about 13-14, and the number of fingerprint lines of the adult is about 7-8; and the number of fingerprint lines of the child obtained in the diagonal direction is about 16-17, and the number of fingerprint lines of the adult is about 9-10. It may be seen from the above that the direction in which the user presses the fingerprint is not fixed, and the number of fingerprint lines is different due to different total sensing lengths when calculated (for example, the total length in the diagonal direction is greater, and theoretically the number of fingerprint lines that may be obtained will be larger), so that the setting of the line number threshold needs to be set with reference to the maximum number of fingerprint lines of the fingerprint image calculated in various directions (for example, in other embodiments, the center of the fingerprint image data may be used as an origin of an XY plane coordinate axis, and the origin of the coordinate axis is taken as the center to respectively calculate the number of fingerprint lines in the direction of 0°, 45°, 90°, 135° or any other angle of the coordinate axis). For example, in the number of fingerprint lines calculated in the directions in this example, the maximum number of fingerprint lines of the child is 17, and the maximum number of fingerprint lines of the adult is 10, so that a line number threshold, for example, 13 may be set. When the maximum number of fingerprint lines is less than the line number threshold, the skin texture with the skin texture feature being big is generated, and then the fingerprint of the user is judged to be the fingerprint of the "adult". When the maximum number of fingerprint lines is greater than the line number threshold, the skin texture with the skin texture feature being small is generated, and then the fingerprint of the user is judged to be the fingerprint of the "child".

Referring to FIG. 23, FIG. 23 is a schematic diagram of performing binary image processing on image data of FIG. 21. It may be found in FIG. 23 that after binary image processing, there may be an area with poor image capture, such as a boxed part, so that an image quality parameter may be set during the image capture. The number of black or white dots in the area is limited to filter images with poor sampling quality. When the number of black or white dots in the area exceeds the image quality parameter, the user may be required to press the fingerprint again for sampling.

Figure 24:
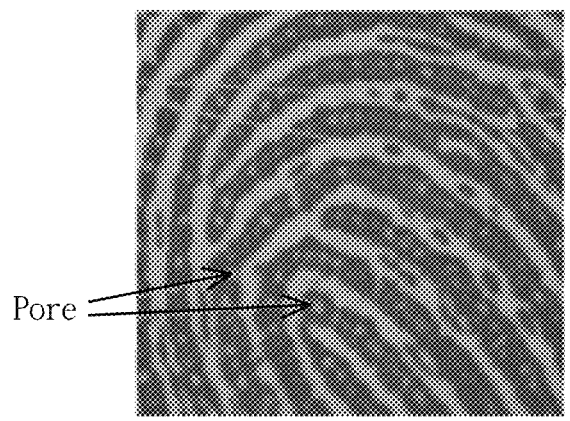
FIG. 24 is a schematic diagram of high-definition fingerprint image data of an adult according to an embodiment of the present invention.

Referring to FIG. 24, FIG. 24 is a schematic diagram of fingerprint image data of an adult acquired by a high-resolution skin texture feature generating module 2. It may be seen from FIG. 24 that clear pores may be seen in the fingerprint image data of the adult acquired under a high resolution, and the present invention may also judge whether the user is the child or the adult by whether the pores are clear or whether the pores exist.

In this embodiment, a pore image of the child may not be acquired under the high resolution, but the pores of the adult are clearly visible, wherein because the pores of the human body will shrink rapidly after death, a clear pore image of only the living adult may be acquired.

Figure 25:
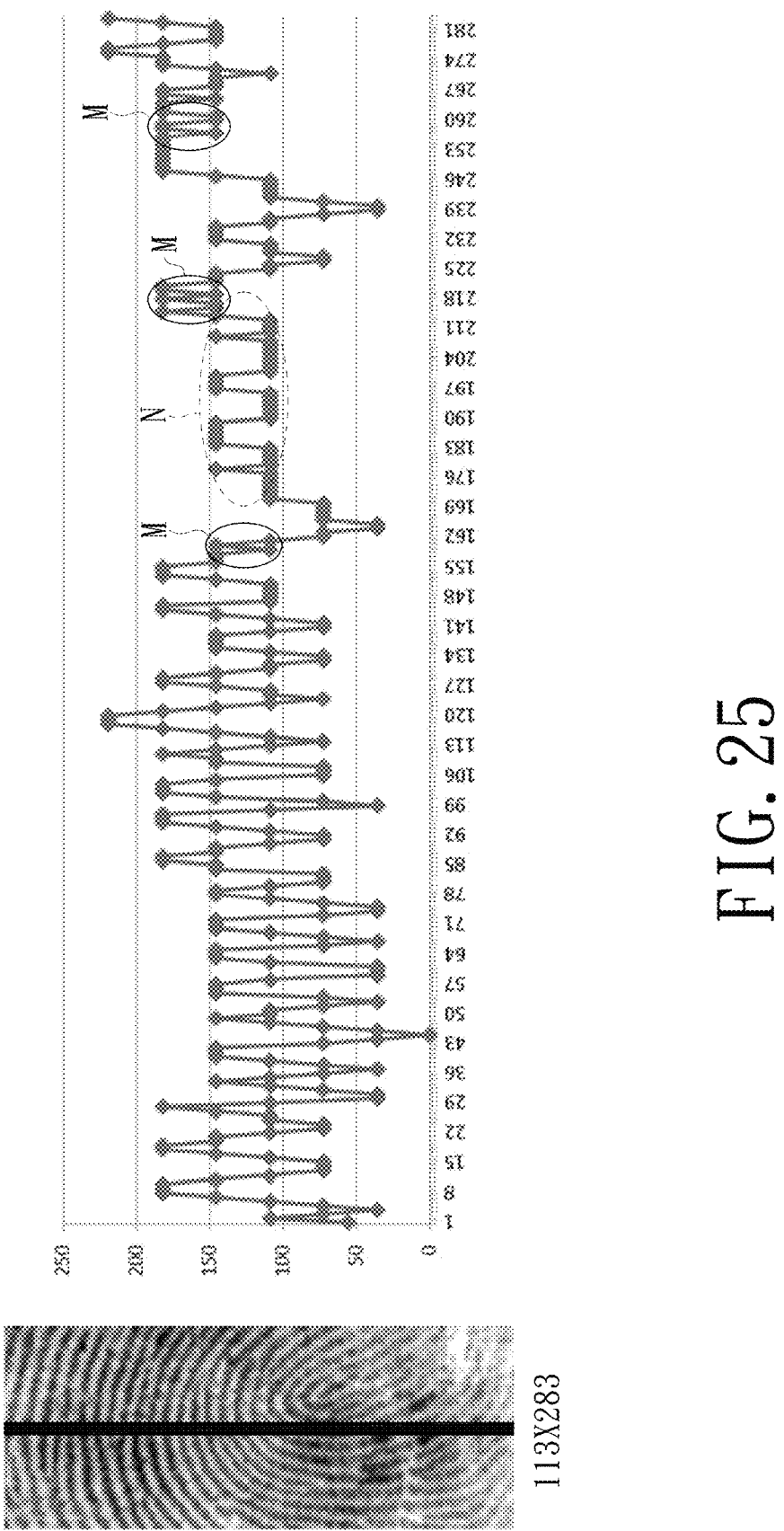
FIG. 25 is a line graph of fingerprint images and corresponding grayscale value data according to an embodiment of the present invention.

Referring to FIG. 25, FIG. 25 is a grayscale value data graph of a fingerprint image obtained by a skin texture feature generating module 2, wherein an image on a left side of FIG. 25 is an 8-bit grayscale depth fingerprint image containing 113*283 pixels, and a right side thereof is provided with grayscale value data corresponding to a central thick black line part of the fingerprint image.

In an example of FIG. 25, the feature generating unit 22 may further generate the skin texture stripe data according to part of the skin texture sampling data in the second period of the working period. For example, because a spacing between the fingerprint lines is roughly fixed, theoretically it will not change within such a short distance, so that a circled area "M" will be removed as noise; a difference (that is, a difference between the grayscale values of the acquired skin ridge and skin valley) between the grayscale values of a circled area "N" is too small, so that data of a distance between the skin ridge and the skin valley may be calculated only by data of other paragraphs without using data of the circled area "N", for example, only data from the 1st pixel to the 150th pixel is calculated. Alternatively, the user may be required to press the fingerprint again for sampling to obtain sampling data with the better quality.

In this embodiment, the control module 3 included in the skin texture control system 1 provided by the present invention is connected to the skin texture feature generating module 2 for receiving the skin texture feature and outputting the control command corresponding to the skin texture feature in the third period following the second period.

In this embodiment, the controlled module 4 included in the skin texture control system 1 provided by the present invention is connected to the control module 3 for receiving the control command. The controlled module 4 is controlled by the control command of the control module 3, and the control module 4 performs the corresponding action.

For example, specifically the control module 3 and the controlled module 4 may be respectively a control module 3 including a control circuit and a controlled module 4 including a power switching circuit, or may be a circuit in the form of a combined circuit containing both the control module 3 and the controlled module 4. The control command may be a control (for example, a program control, a voltage control, a current control or the like, and the present invention does not limit the way of realizing the control) performed for directly or indirectly controlling ON/OFF states in the power switching circuit in any form. The corresponding action is to switch the ON/OFF states in the power switching circuit.

For example, specifically the control module 3 and the controlled module 4 may be respectively a control module 3 including a password input circuit and a controlled module 4 including a pad lock circuit, or may be a circuit in the form of a combined circuit containing both the control module 3 and the controlled module 4. The control command may be a password input (for example, a program control input, a voltage control input, a current control input or the like, and the present invention does not limit the way of realizing the password input) directly or indirectly performed on a pad lock in any form. As one of embodiments, the password input may be a sequence of the skin texture feature generated when the skin texture of the user touches the skin texture feature generating module, and the corresponding action is to judge whether an input password conforms to a password of the system.

An implementation of the password input of the pad lock in the above embodiment is further described below.

In this example, the pad lock in the skin texture control system 1 may record that the user performs a touch by one of the fingertip portion of the fingerprint, the side portion of the fingerprint, and the finger pulp portion of the fingerprint, and a recorded touch sequence is input as a password. Whether the input password conforms to the password of the system is judged, and then the pad lock is unlocked.

For example, the password of the pad lock in the skin texture control system 1 may be set in the following sequence: (1) the fingertip portion of the fingerprint→(2) the side portion of the fingerprint→(3) the finger pulp portion of the fingerprint→(2) the side portion of the fingerprint→(3) the finger pulp portion of the fingerprint→(3) the finger pulp portion of the fingerprint→(1) the fingertip portion of the fingerprint. The following code numbers are written for easy understanding: 1→2→3→2→3→3→1. When the touch sequence of the user is as above, because the touch sequence of the user is the same as the password of the system, it is judged that the input password conforms to the password of the system, and then the pad lock is unlocked. When the touch sequence of the user is assumed to be: 1→2→2→2→3→3→1, because the touch sequence of the user is different from the password of the system, it is judged that the input password does not conform to the password of the system, and the pad lock may not be unlocked.

For example, specifically the control module 3 and the controlled module 4 may be respectively a control module 3 including a skin texture feature output circuit and a controlled module 4 including a selection input circuit, or may be a circuit in the form of a combined circuit containing both the control module 3 and the controlled module 4. The control command may be an input (for example, a program control input, a voltage control input, a current control input or the like, and the present invention does not limit the way of realizing the selection input) directly or indirectly performed on the selection input circuit by the skin texture feature as an input option in any form. As one of embodiments, the corresponding action may be to start a power supply of the skin texture control system 1, but the corresponding action may be any action in the skin texture control system 1, which is not limited here by the present invention.

For example, specifically the control module 3 and the controlled module 4 may be respectively a control module 3 including a control circuit and a controlled module 4 including a volume adjustment circuit, or may be a circuit in the form of a combined circuit containing both the control module 3 and the controlled module 4. The control command may be to perform a volume adjustment (for example, a program control, a voltage control, a current control or the like, and the present invention does not limit the way of realizing the control) through the volume adjustment circuit of the controlled module. The corresponding action may be to adjust output volume of the controlled module 4 such as a Bluetooth headset.

Referring to FIG. 26, FIG. 27, FIG. 28, FIG. 29, and FIG. 30, which are schematic diagrams of an arrangement of sensing pixels of a sampling unit 21 (or, may also referred to as a skin texture sampling device) of a skin texture feature generating module 2 in an embodiment.

In the above embodiment, the sampling unit 21 is a sensing pixel line of which a plurality of sensing pixels are arranged along a direction at equal intervals, or the plurality of sensing pixels are arranged in an arrangement mode of an array sensing area. But in order to reduce the integrated circuit area occupied during the design of an integrated circuit (IC), the present invention may also arrange the sensing pixels as shown in FIG. 26, FIG. 27, FIG. 28, FIG. 29, and FIG. 30. Under the arrangement mode as shown in the figure, the following skin texture feature of the fingerprint may be generated: the fingertip portion of the fingerprint, the side portion of the fingerprint, and the finger pulp portion of the fingerprint. Under the condition of taking into account the circuit design of the integrated circuit (IC), the sensing pixels may further be arranged within a range of integrated circuit packaging as shown in FIG. 28, and the plurality of sensing pixels of the sampling unit 21 are arranged on an edge of the sampling unit 21 to provide more spaces required for complete IC design.

Figure 26:
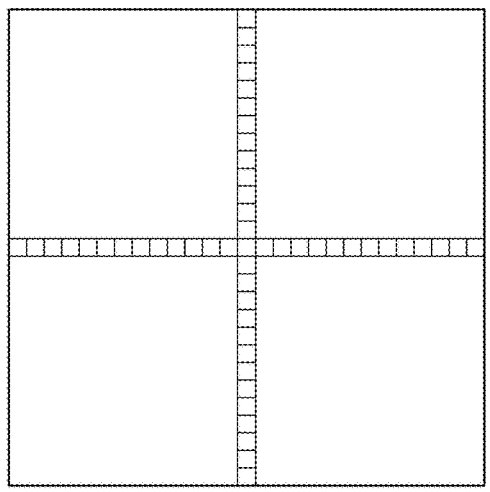
FIG. 26, FIG. 27, FIG. 28, FIG. 29, and FIG. 30 are schematic diagrams of an arrangement of sensing pixels of a skin texture feature generating module according to an embodiment of the present invention.

Referring to FIG. 26 and FIG. 28, in one of embodiments, the sampling unit 21 of the skin texture control system 1 provided by the present invention includes: a first sensing pixel line of which a plurality of sensing pixels are arranged along a first direction at equal intervals; and a second sensing pixel line of which a plurality of sensing pixels are arranged along a second direction at equal intervals, wherein the first direction and the second direction are perpendicular to each other. In addition, as shown in the figure, the sampling unit 21 may not include sensing pixels for sensing the skin texture of the user other than the first sensing pixel line and the second sensing pixel line, that is to say, the sensing pixels for sensing the skin texture of the user in the sampling unit 21 may only include a plurality of sensing pixels of a first sensing pixel line and a second sensing pixel line.

Figure 27:
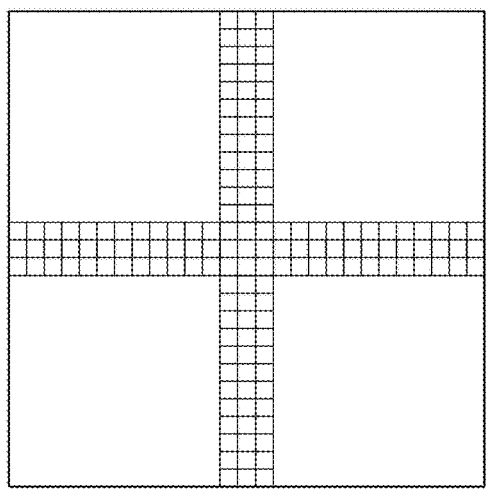
Figure 28:
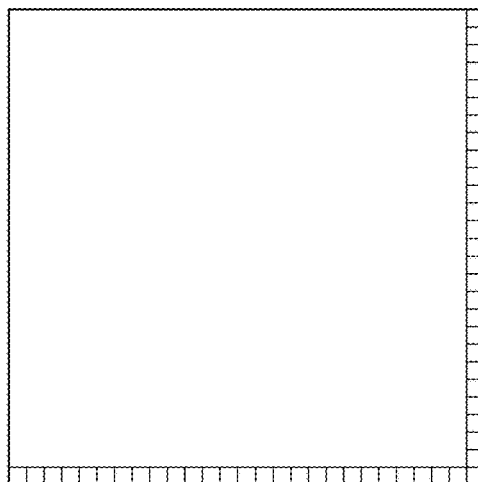

Referring to FIG. 27, in one of embodiments, the sampling unit 21 of the skin texture control system 1 provided by the present invention includes: a plurality of first sensing pixel lines, a plurality of sensing pixels of each of the plurality of first sensing pixel lines being arranged along a first direction at equal intervals; and a plurality of second sensing pixel lines, a plurality of sensing pixels of each of the plurality of second sensing pixel lines being arranged along a second direction at equal intervals, wherein the first direction and the second direction are perpendicular to each other. In yet another embodiment, the total column number of a plurality of first sensing pixel lines is less than the sensing pixel number of a plurality of sensing pixels of the first sensing pixel lines, the total column number of a plurality of second sensing pixel lines is less than the sensing pixel number of a plurality of sensing pixels of the second sensing pixel lines, and as shown in the figure, the sampling unit 21 may not include sensing pixels for sensing the skin texture of the user other than the plurality of first sensing pixel lines and the plurality of second sensing pixel lines, that is to say, the sensing pixels for sensing the skin texture of the user in the sampling unit 21 may only include sensing pixels of a plurality of first sensing pixel lines and a plurality of second sensing pixel lines. In the embodiment of FIG. 27, three first sensing pixel lines and three second sensing pixel lines are arranged. Compared with the arrangement in FIG. 26, the arrangement in FIG. 27 may further achieve the technical effect of improving the correctness of the skin texture feature of the fingerprint. Although the three first sensing pixel lines and the three second sensing pixel lines are arranged in the embodiment of FIG. 27, two first sensing pixel lines and two second sensing pixel lines may also be arranged, alternatively, more than three first sensing pixel lines and more than three second sensing pixel lines may also be arranged, which is not limited here by the present invention.

Figure 29:
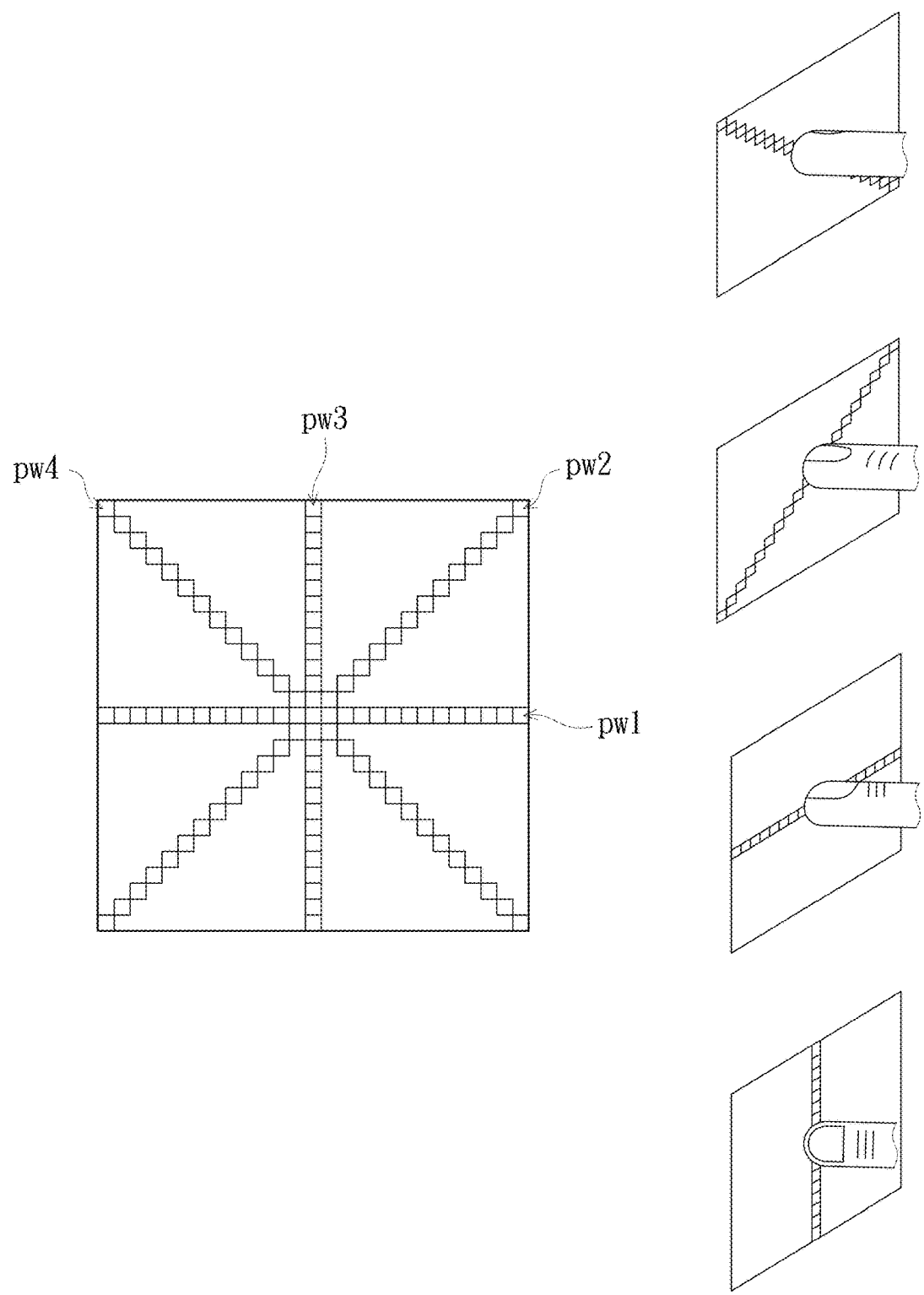

Referring to FIG. 29, in one of embodiments, the plurality of sensing pixels of the sampling unit 21 of the skin texture control system 1 provided by the present invention are arranged in an arrangement mode of a plurality of linear sensing pixel lines staggered mutually. The sensing pixels of the sampling unit 21 of the skin texture feature generating module 2 may be arranged in a mode as shown in FIG. 29, and as shown in the figure, the sampling unit 21 may not include sensing pixels for sensing the skin texture of the user other than the plurality of linear sensing pixel lines, that is to say, the sensing pixels for sensing the skin texture of the user in the sampling unit 21 may only include sensing pixels of a plurality of linear sensing pixel lines. Under the arrangement as shown in FIG. 29, the present invention may generate the skin texture feature "skin texture deflection" corresponding to a deflection angle of the skin texture of the finger, and is further configured for the password input.

As one of embodiments, the user touches the skin texture feature generating module 2 at different angles by only using the area 1 (fingertip) of the fingerprint. For example: when the fingertip is not deflected, the skin texture feature generating module 2 performs sampling and generates the skin texture deflection of 0°, and records it as a password "1" (pw1 as shown in the figure); when the fingertip is deflected by 45°, the skin texture feature generating module 2 performs sampling and generates the skin texture deflection of 45°, and records it as a password "2" (pw2 as shown in the figure); when the fingertip is deflected by 90°, the skin texture feature generating module 2 performs sampling and generates the skin texture deflection of 90°, and records it as a password "3" (pw3 as shown in the figure); when the fingertip is deflected by 135°, the skin texture feature generating module 2 performs sampling and generates the skin texture deflection of 135°, and records it as a password "4" (pw4 as shown in the figure); and when the fingertip is deflected by 180°, which is the same as the situation that the fingertip is not deflected, the skin texture feature generating module 2 performs sampling and generates the skin texture deflection of 0°, and records it as a password "1" (pw1 as shown in the figure).

By recording the deflection angle of the fingertip, the present invention may be further applied to the fingerprint pad lock. For example, the fingerprint pad lock may record the deflection angle of the fingertip as a password and set the following sequence: 1→2→3-14→1→2→1. When the sequence of touching the skin texture feature generating module 2 by deflecting the fingertip by the user is as above, the fingerprint pad lock may be unlocked. If the sequence of touching by deflecting the fingertip by the user is as follows: 1→2→2→2→4→3→1, because the sequence of touching the skin texture feature generating module 2 by deflecting the fingertip by the user is different from the set sequence, the pad lock may not be unlocked.

Figure 30:
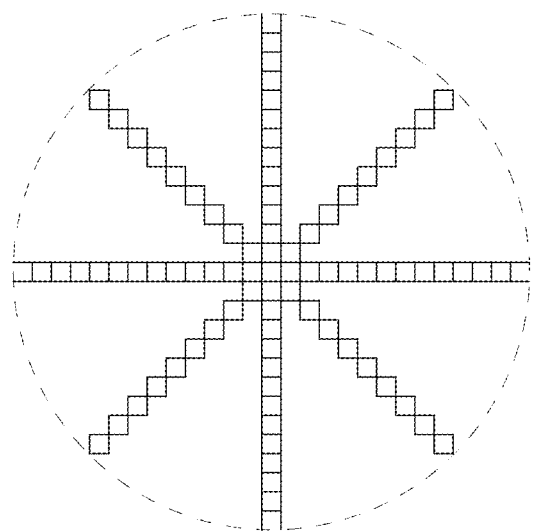

Referring to FIG. 30, in one of embodiments, a plurality of sensing pixels of the sampling unit 21 of the skin texture control system 1 provided by the present invention may be distributed within a range of circular packaging of an integrated circuit. Under the arrangement as shown in FIG. 30, because the total sensing lengths in the directions are same, the present invention does not need to respectively set thresholds in the directions. For example, in the embodiment of FIG. 29, the total length of the sensing pixels positioned in the diagonal direction is about 1.414 times the total length of the sensing pixels in the X direction of the coordinate axis and the Y direction of the coordinate axis. Therefore, when the black and white conversion number threshold as described above is set, the adjustment must refer to the total length of the sensing pixels. For example, when the black and white conversion number threshold in the X direction of the coordinate axis is set to be 10, the black and white conversion number threshold in the diagonal direction may be set to be 14 with reference to the total length of the sensing pixels. In addition, although the black and white conversion number threshold is taken as an example in this example, the present invention is not limited to this. When any threshold mentioned in the present invention is set, the adjustment may be performed with reference to the total sensing lengths in the directions, and meanwhile, the package diameter of the IC may be reduced when the integrated circuit (IC) is circularly packaged, so as to achieve a smaller IC size.

Figure 31:
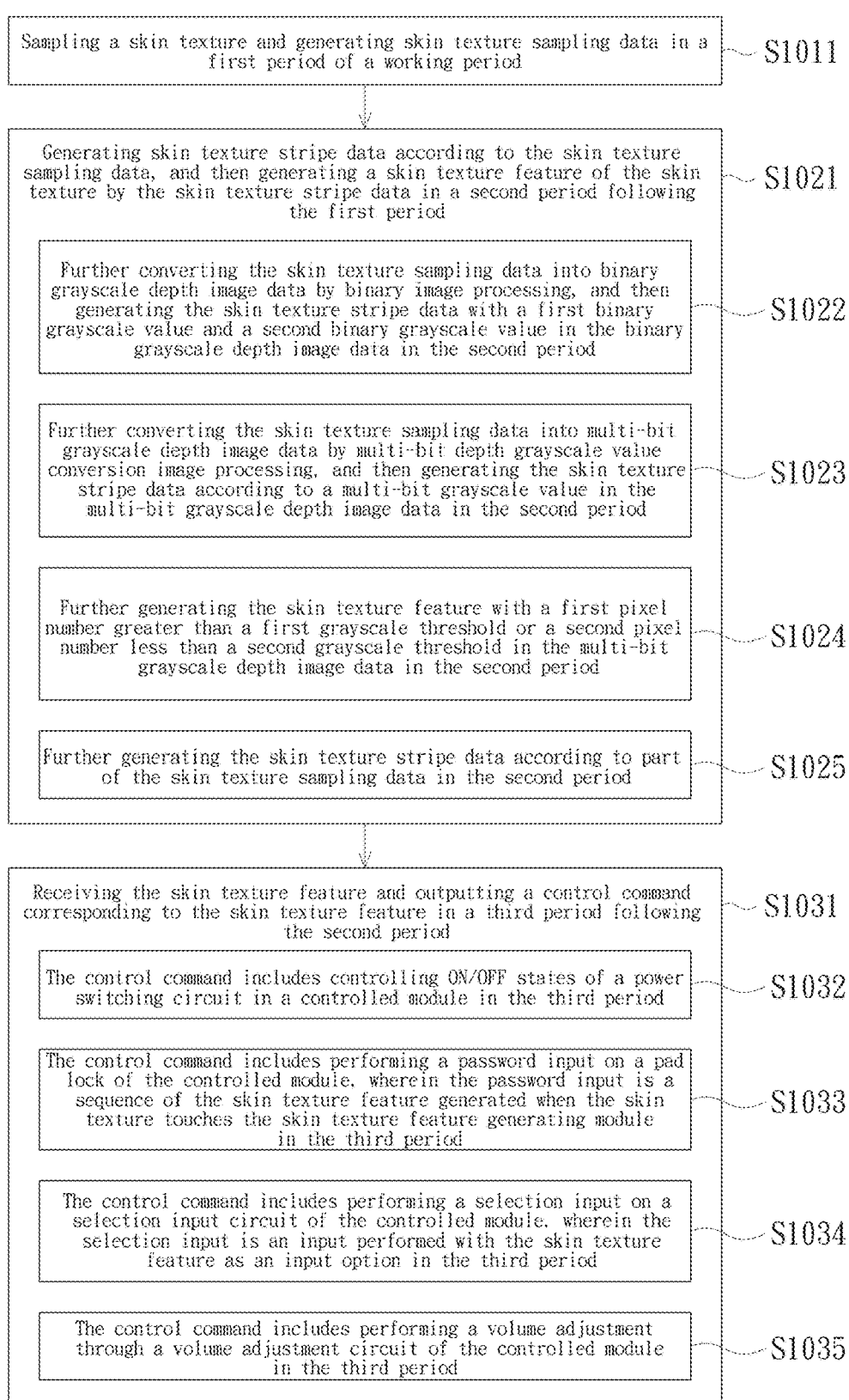
FIG. 31 is a flowchart of a skin texture control method provided by an embodiment of the present invention.

Referring to FIG. 31, this embodiment further provides a skin texture control method. Because the specific implementation and operation principle have been clearly written in the embodiments of the aforementioned skin texture control system 1, the details are not described again here, referring to the embodiments of the aforementioned skin texture control system 1.

The skin texture control method provided by this embodiment is applicable to the skin texture control system 1, and the skin texture control system 1 includes: a skin texture feature generating module 2 and a control module 3, wherein the skin texture feature generating module 2 is connected to the control module 3, and the skin texture control method includes: step S1011: sampling a skin texture and generating skin texture sampling data in a first period of a working period; step S1021: generating skin texture stripe data according to the skin texture sampling data, and then generating a skin texture feature of the skin texture by the skin texture stripe data in a second period following the first period; and step S1031: receiving the skin texture feature and outputting a control command corresponding to the skin texture feature in a third period following the second period.

The step S1021 of the skin texture control method applicable to the skin texture control system 1 may further include step S1022: converting the skin texture sampling data into binary grayscale depth image data by binary image processing, and then generating the skin texture stripe data with a first binary grayscale value and a second binary grayscale value in the binary grayscale depth image data in the second period.

The step S1021 of the skin texture control method applicable to the skin texture control system 1 may further include step S1023: converting the skin texture sampling data into multi-bit grayscale depth image data by multi-bit depth grayscale value conversion image processing, and then generating the skin texture stripe data according to a multi-bit grayscale value in the multi-bit grayscale depth image data in the second period.

The step S1021 of the skin texture control method applicable to the skin texture control system 1 may further include step S1024: generating the skin texture feature with a first pixel number greater than a first grayscale threshold or a second pixel number less than a second grayscale threshold in the multi-bit grayscale depth image data in the second period.

The step S1021 of the skin texture control method applicable to the skin texture control system 1 may further include step S1025: generating the skin texture stripe data according to part of the skin texture sampling data in the second period.

In the skin texture control method applicable to the skin texture control system 1, the skin texture stripe data includes at least any one of the length, spacing, number, pores, and clarity of skin texture stripes.

In the skin texture control method applicable to the skin texture control system 1, the skin texture feature includes at least any one of a fingertip portion of a fingerprint, a side portion of the fingerprint, a finger pulp portion of the fingerprint, a skin texture size, and a skin texture deflection.

In the skin texture control method applicable to the skin texture control system 1, the skin texture control system 1 may further include a controlled module with a power switching circuit, the controlled module is connected to the control module for receiving the control command, and the step S1031 of the skin texture control method may further include: step S1032: in the third period, the control command includes controlling ON/OFF states of the power switching circuit in the controlled module.

In the skin texture control method applicable to the skin texture control system 1, the skin texture control system 1 may further include a controlled module with a pad lock, the controlled module is connected to the control module for receiving the control command, and the step S1031 of the skin texture control method may further include: step S1033: in the third period, the control command includes performing a password input on the pad lock of the controlled module, wherein the password input is a sequence of the skin texture feature generated when the skin texture touches the skin texture feature generating module.

In the skin texture control method applicable to the skin texture control system 1, the skin texture control system 1 may further include a controlled module with a selection input circuit, the controlled module is connected to the control module for receiving the control command, and the step S1031 of the skin texture control method may further include: step S1034: in the third period, the control command includes performing a selection input on the selection input circuit of the controlled module, wherein the selection input is an input performed with the skin texture feature as an input option.

In the skin texture control method applicable to the skin texture control system 1, the skin texture control system 1 may further include a controlled module with a volume adjustment circuit, the controlled module is connected to the control module for receiving the control command, and the step S1031 of the skin texture control method may further include: step S1035: in the third period, the control command includes performing a volume adjustment through the volume adjustment circuit of the controlled module.

In the skin texture control method applicable to the skin texture control system 1, the skin texture feature generating module 2 of the skin texture control system 1 may further include: a first sensing pixel line of which a plurality of sensing pixels are arranged along a first direction at equal intervals; and a second sensing pixel line of which a plurality of sensing pixels are arranged along a second direction at equal intervals, wherein the first direction and the second direction are perpendicular to each other.

In the skin texture control method applicable to the skin texture control system 1, the skin texture feature generating module 2 of the skin texture control system 1 may further include: a sensing pixel line of which a plurality of sensing pixels are arranged along a direction at equal intervals.

In the skin texture control method applicable to the skin texture control system 1, the skin texture feature generating module 2 of the skin texture control system 1 may further include: a plurality of first sensing pixel lines, a plurality of sensing pixels of each of the plurality of first sensing pixel lines being arranged along a first direction at equal intervals; and a plurality of second sensing pixel lines, a plurality of sensing pixels of each of the plurality of second sensing pixel lines being arranged along a second direction at equal intervals, wherein the first direction and the second direction are perpendicular to each other.

In the skin texture control method applicable to the skin texture control system 1, a plurality of sensing pixels of the skin texture feature generating module 2 of the skin texture control system 1 may further be distributed within a range of circular packaging of an integrated circuit.

In the skin texture control method applicable to the skin texture control system 1, the plurality of sensing pixels of the skin texture feature generating module 2 of the skin texture control system 1 may further be arranged in an arrangement mode of a plurality of linear sensing pixel lines staggered mutually.

In the skin texture control method applicable to the skin texture control system 1, the plurality of sensing pixels of the skin texture feature generating module 2 of the skin texture control system 1 may further be arranged in an arrangement mode of an array sensing area.

Figure 32:
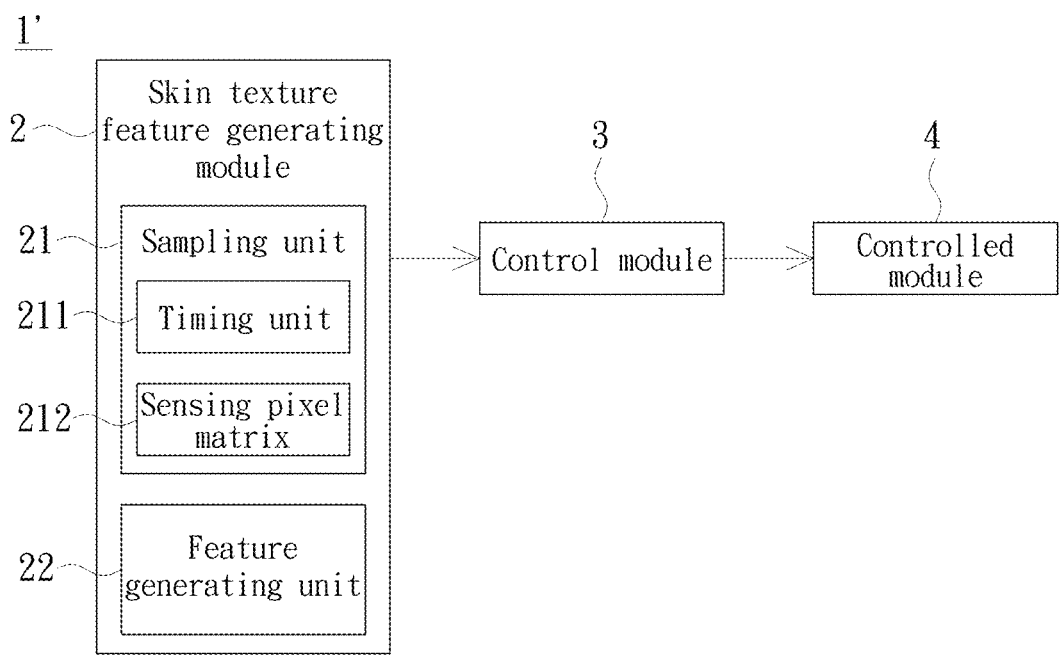
FIG. 32 is a block diagram of a skin texture control system provided by another embodiment of the present invention.

Refer to FIG. 32, which is a block diagram of a skin texture control system provided by another embodiment of the present invention.

In this embodiment, a skin texture control system 1' provided by the present invention includes a skin texture feature generating module 2, a control module 3, and a controlled module 4, wherein the skin texture feature generating module 2 includes a sampling unit 21 (or, may also be referred to as a skin texture sampling device) and a feature generating unit 22, the sampling unit 21 includes a timing unit 211 and a sensing pixel area 212, the skin texture feature generating module 2 is connected to the control module 3, and the control module 3 is connected to the controlled module 4.

In this embodiment, the skin texture feature generating module 2 of the skin texture control system 1' provided by the present invention is configured for generating a skin texture sliding direction of a skin texture of a user, the control module 3 is configured for receiving the skin texture sliding direction and outputting a control command corresponding to the skin texture sliding direction, and then the controlled module 4 is configured for receiving the control command of the control module 3, wherein the controlled module 4 is controlled by the control command of the control module 3, and the controlled module 4 performs a corresponding action.

Figure 33:
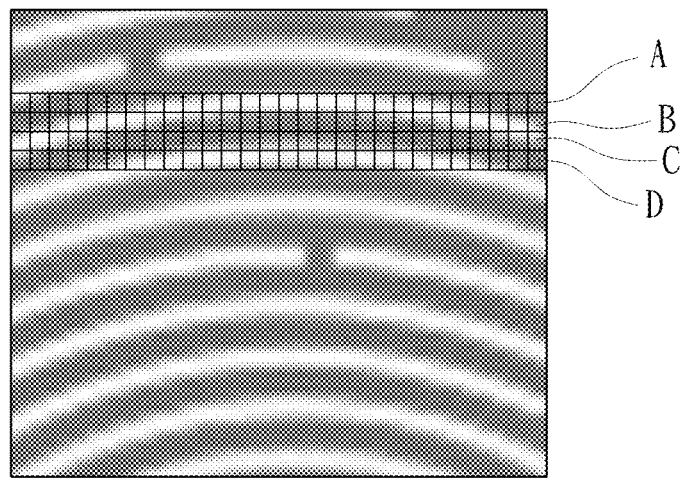
FIG. 33 is a schematic diagram of a way of judging upward/downward sliding of a skin texture according to an embodiment of the present invention.
Figure 33:
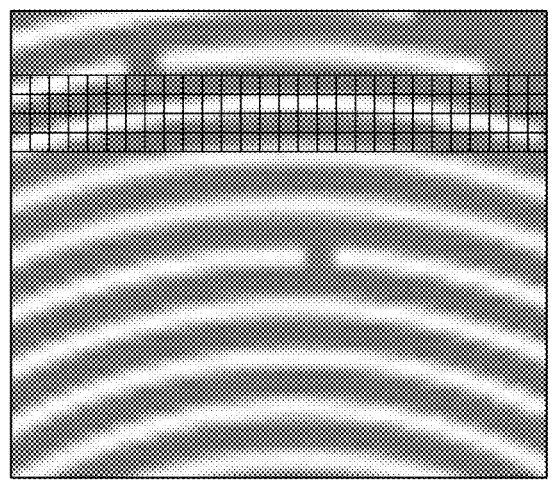

Referring to FIG. 33, FIG. 33 is a schematic diagram of generating a skin texture sliding direction of a skin texture of a user by taking an example of generating an upward/downward skin texture sliding direction. In this example, the skin texture feature generating module 2 includes the timing unit 211 for calculating a unit of time, and the sensing pixel area 212, wherein a plurality of sensing pixels of the sensing pixel area may be classified into a plurality of sensing pixel lines arranged in a first direction (e.g., a transverse direction) or a plurality of sensing pixel lines arranged in a second direction (e.g., a vertical direction). In this example, the sensing pixel area 212 with 4 sensing pixel lines (A, B, C, D) is classified into the sensing pixel lines arranged in the first direction (the transverse direction), and is configured for generating the upward/downward skin texture sliding direction of the skin texture of the user as an example, wherein each of the sensing pixel lines (A, B, C, D) has 28 sensing pixels.

In this embodiment, the present invention may calculate a unit of time by the timing unit 211, and respectively record grayscale values of the sensing pixel lines A, B, C, D at different time points. For example, at a first time point (an earlier time point, Time: 1), the skin texture of the user is sampled and first-direction skin texture primary sampling data is generated for the sensing pixel lines A, B, C, D respectively, then a period of time is calculated by the timing unit 211, and at a second time point (a later time point, Time: 2), the skin texture of the user is sampled again and first-direction skin texture secondary sampling data is generated for the sensing pixel lines A, B, C, D respectively. Next, the feature generating unit 22 respectively converts the first-direction skin texture primary sampling data and the first-direction skin texture secondary sampling data into first-direction skin texture multi-bit depth primary image data A1, B1, C1, D1 and a plurality of first-direction skin texture multi-bit depth secondary image data A2, B2, C2, D2 by multi-bit depth grayscale value conversion image processing, and then performs a grayscale value difference operation and an absolute value operation on the first-direction skin texture multi-bit depth primary image data A1, B1, C1, D1 and the first-direction skin texture multi-bit depth secondary image data A2, B2, C2, D2 to obtain an operation result. For example, "A1, B1, C1" may be compared with "B2, C2, D2", for example, when an absolute value (the operation result) of (A1-B2)+(B1-C2)+(C1-D2) is lower than a first grayscale difference threshold, the skin texture sliding direction "downward sliding of the skin texture" of the skin texture of the user is generated. For example, alternatively "B1, C1, D1" and "A2, B2, C2" are compared, for example, when an absolute value of (B1-A2)+(C1-B2)+(D1-C2) is lower than a second grayscale difference threshold, the skin texture sliding direction "upward sliding of the skin texture" of the skin texture of the user is generated, wherein the skin texture sliding directions "downward sliding of the skin texture" and "upward sliding of the skin texture" are perpendicular to the first direction of the arrangement and classification direction of the sensing pixel area 212.

Figure 34:
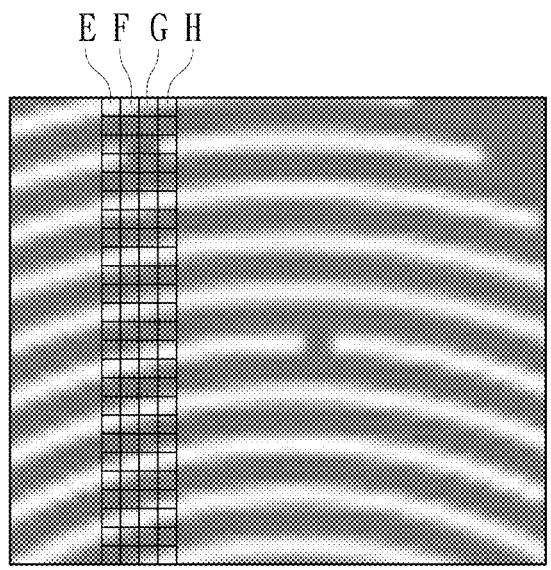
FIG. 34 is a schematic diagram of a way of judging leftward/rightward sliding of a skin texture according to an embodiment of the present invention.
Figure 34:
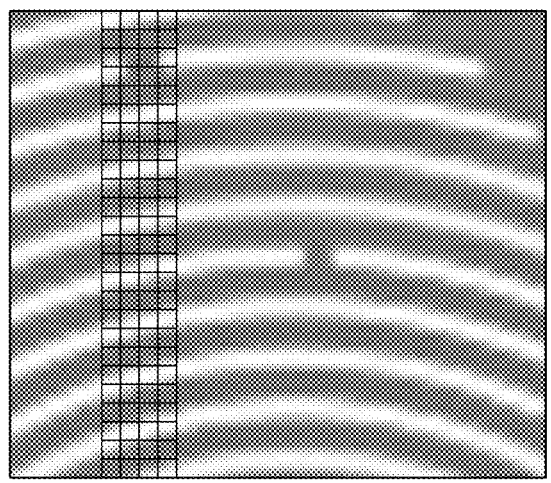

Referring to FIG. 34, FIG. 34 is a schematic diagram of generating a skin texture sliding direction of a skin texture of a user by taking an example of generating a leftward/rightward skin texture sliding direction. In this example, the skin texture feature generating module 2 includes the timing unit 211 for calculating a unit of time, and the sensing pixel area 212, wherein a plurality of sensing pixels of the sensing pixel area 212 may be classified into a plurality of sensing pixel lines arranged in a first direction (e.g., a transverse direction) or a plurality of sensing pixel lines arranged in a second direction (e.g., a vertical direction). In this example, the sensing pixel area 212 with 4 sensing pixel lines (E, F, G, H) is classified into the sensing pixel lines arranged in the second direction (the vertical direction), and is configured for generating the leftward/rightward skin texture sliding direction of the skin texture of the user as an example, wherein each of the sensing pixel lines (E, F, G, H) has 28 sensing pixels.

In this embodiment, the present invention may calculate a period of time by the timing unit 211, and respectively record grayscale values of the sensing pixel lines E, F, G, H at different time points. For example, at a first time point (an earlier time point, Time: 1), the skin texture of the user is sampled and second-direction skin texture primary sampling data is generated for the sensing pixel lines E, F, G, H respectively, then a period of time is calculated by the timing unit 211, and at a second time point (a later time point, Time: 2), the skin texture of the user is sampled again and second-direction skin texture secondary sampling data is generated for the sensing pixel lines E, F, G, H respectively. Next, the feature generating unit 22 respectively converts the second-direction skin texture primary sampling data and the second-direction skin texture secondary sampling data into second-direction skin texture multi-bit depth primary image data E1, F1, G1, H1 and a plurality of second-direction skin texture multi-bit depth secondary image data E2, F2, G2, H2 by multi-bit depth grayscale value conversion image processing, and then performs a grayscale value difference operation and an absolute value operation on the second-direction skin texture multi-bit depth primary image data E1, F1, G1, H1 and the second-direction skin texture multi-bit depth secondary image data E2, F2, G2, H2 to obtain an operation result. For example, "E1, F1, G1" may be compared with "F2, G2, 112", for example, when an absolute value (the operation result) of (E1-F2)+(F1-G2)+(G1-H2) is lower than a first grayscale difference threshold, the skin texture sliding direction "rightward sliding of the skin texture" of the skin texture of the user is generated. For example, alternatively "F1, G1, H1" and "E2, F2, G2" are compared, for example, when an absolute value of (F1-E2)+(G1-F2)+(H1-G2) is lower than a second grayscale difference threshold, the skin texture sliding direction "leftward sliding of the skin texture" of the skin texture of the user is generated, wherein the skin texture sliding directions "rightward sliding of the skin texture" and "leftward sliding of the skin texture" are perpendicular to the second direction of the arrangement and classification direction of the sensing pixel area 212.

Although the sensing pixel area 212 with 4 columns is taken as an example in this embodiment, this is only an example. The present invention may use a skin texture sampling device with more or fewer columns of sensing pixels, which is not limited here by the present invention.

Although the sensing pixel area 212 with 4 columns is taken as an example in this embodiment, the arrangement of the sensing pixels is not limited to a matrix arrangement. Referring to FIG. 29, in another embodiment, the plurality of sensing pixels of the sampling unit 21 of the skin texture control system 1' may also be arranged in an arrangement mode of the plurality of linear sensing pixel lines staggered mutually as shown in FIG. 29. Then, the plurality of sensing pixels of each of the linear sensing pixel lines are classified according to the arrangement direction of the sensing pixels of each of the linear sensing pixel lines. For example, in FIG. 29, the direction of pw1 may be defined as the direction of 0/180°, the direction of pw2 may be defined as the direction of 45/225°, the direction of pw3 may be defined as the direction of 90/270°, and the direction of pw4 may be defined as the direction of 135/315°; and each sensing pixel in the linear sensing pixel line positioned in the direction of 0/180° (pw1) is classified into a sensing pixel line in the direction of 90/270° perpendicular to the direction of 0/180° (that is to say, in this embodiment, each sensing pixel line has only one sensing pixel, and each sensing pixel is classified into the sensing pixel line in the direction of 90/270°), and is configured for generating the skin texture sliding direction "direction of 0°"' or "direction of 180°"' of the skin texture of the user, wherein the way of judging the "direction of 0°"' or "direction of 180°"' is the same as that in the embodiment of the sensing pixel area 212 with 4 columns, which will not be described again. Similarly, each sensing pixel in the linear sensing pixel line positioned in the direction of 45/225° (pw2) is classified into a sensing pixel line in the direction of 135/315° perpendicular to the direction of 45/225°, and is configured for generating the skin texture sliding direction "direction of 450°"' or "direction of 225°"' of the skin texture of the user; each sensing pixel in the linear sensing pixel line positioned in the direction of 90/270° (pw3) is classified into a sensing pixel line in the direction of 0/180° perpendicular to the direction of 90/270°, and is configured for generating the skin texture sliding direction "direction of 90°" or "direction of 270°" of the skin texture of the user; and each sensing pixel in the linear sensing pixel line positioned in the direction of 135/315° (pw4) is classified into a sensing pixel line in the direction of 45/225° perpendicular to the direction of 135/315°, and is configured for generating the skin texture sliding direction "direction of 135°" or "direction of 315°" of the skin texture of the user.

As described above, the plurality of sensing pixels of the sampling unit 21 of the skin texture control system 1' provided by the present invention may also be arranged in an arrangement mode of the plurality of linear sensing pixel lines staggered mutually as shown in FIG. 29, but the generated skin texture sliding direction of the skin texture of the user is not limited to the angles (for example, including 0°, 45°, 90°, 135°, 180°, 225°, 270°, 315°) exemplified in this embodiment. According to different arrangement directions of the sensing pixels of the linear sensing pixel lines, the present invention may have a plurality of implementations, and is not limited to the angles listed in this embodiment, which is not limited here by the present invention.

In this embodiment, although the skin texture sliding direction such as the upward/downward skin texture sliding direction, the leftward/rightward skin texture sliding direction, the direction of 0°, the direction of 45° or the like is separately implemented as an example, this is only an example. The present invention may also simultaneously classify the plurality of sensing pixels of the sampling unit 21 into, for example, the plurality of sensing pixel lines arranged in the first direction and the plurality of sensing pixel lines arranged in the second direction, or according to the arrangement direction of the sensing pixels of each linear sensing pixel line, classify the plurality of sensing pixels of each linear sensing pixel line, that is to say, the same sensing pixel area may be used for generating the skin texture sliding direction, such as including at least any one of "upward sliding of the skin texture", "downward sliding of the skin texture", "leftward sliding of the skin texture", "rightward sliding of the skin texture", "direction of 0°", "direction of 45°", "direction of 90°", "direction of 135°", "direction of 180°", "direction of 225°", "direction of 270°", and "direction of 315°", which is not limited here by the present invention.

In this embodiment, the control module 3 included in the skin texture control system 1' provided by the present invention is connected to the skin texture feature generating module 2 for receiving the skin texture sliding direction and outputting the control command corresponding to the skin texture sliding direction.

In this embodiment, the controlled module 4 included in the skin texture control system 1' provided by the present invention is connected to the control module 3 for receiving the control command, the controlled module 4 is controlled by the control command of the control module 3, and the controlled module 4 performs the corresponding action.

For example, specifically the control module 3 and the controlled module 4 may be respectively a control module 3 including a control circuit and a controlled module 4 including a power switching circuit, or may be a circuit in the form of a combined circuit containing both the control module 3 and the controlled module 4. The control command may be a control (for example, a program control, a voltage control, a current control or the like, and the present invention does not limit the way of realizing the control) performed for directly or indirectly controlling ON/OFF states in the power switching circuit in any form. The corresponding action is to switch the ON/OFF states in the power switching circuit.

For example, specifically the control module 3 and the controlled module 4 may be respectively a control module 3 including a password input circuit and a controlled module 4 including a pad lock circuit, or may be a circuit in the form of a combined circuit containing both the control module 3 and the controlled module 4. The control command may be a password input (for example, a program control input, a voltage control input, a current control input or the like, and the present invention does not limit the way of realizing the password input) directly or indirectly performed on a pad lock in any form. As one of embodiments, the password input may be the skin texture sliding direction generated when the skin texture of the user touches the skin texture feature generating module, and the corresponding action is to judge whether an input password conforms to a password of the system.

An implementation of the password input of the pad lock in the above embodiment is further described below.

In this example, the pad lock in the skin texture control system 1' may record that the user performs a touch by the skin texture sliding direction, including, for example, "upward sliding of the skin texture", "downward sliding of the skin texture", "leftward sliding of the skin texture", and "rightward sliding of the skin texture", and a recorded touch sequence is input as a password. Whether the input password conforms to the password of the system is judged, and then the pad lock is unlocked.

For example, the password of the pad lock in the skin texture control system 1 may be set in the following sequence: (1) upward sliding of the skin texture→(2) downward sliding of the skin texture→(3) leftward sliding of the skin texture→(4) rightward sliding of the skin texture→(3) leftward sliding of the skin texture→(3) leftward sliding of the skin texture→(1) upward sliding of the skin texture. The following code numbers are written for easy understanding: 1→2→3→4→3→3→1. When the touch sequence of the user is as above, because the touch sequence of the user is the same as the password of the system, it is judged that the input password conforms to the password of the system, and then the pad lock is unlocked. When the touch sequence of the user is assumed to be: 1→2→2→2→3→3→1, because the touch sequence of the user is different from the password of the system, it is judged that the input password does not conform to the password of the system, and the pad lock may not be unlocked.

For example, specifically the control module 3 and the controlled module 4 may be respectively a control module 3 including a skin texture sliding direction output circuit and a controlled module 4 including a selection input circuit, or may be a circuit in the form of a combined circuit containing both the control module 3 and the controlled module 4. The control command may be an input (for example, a program control input, a voltage control input, a current control input or the like, and the present invention does not limit the way of realizing the selection input) directly or indirectly performed on the selection input circuit by the skin texture sliding direction as an input option in any form. The corresponding action may be to, for example, answer a call, reject an incoming call, select a previous/next track in a music playlist, enable/disable an active noise cancellation function of a Bluetooth headset and the like in the controlled module 4 of the Bluetooth headset.

For example, specifically the control module 3 and the controlled module 4 may be respectively a control module 3 including a control circuit and a controlled module 4 including a display module, or may be a circuit in the form of a combined circuit containing both the control module 3 and the controlled module 4. The control command may be to perform a display image moving operation (for example, a program control, a voltage control, a current control or the like, and the present invention does not limit the way of realizing the control) on the display module of the controlled module. The corresponding action may be to, for example, make an image in the display module of a touch screen move corresponding to the skin texture sliding direction.

For example, specifically the control module 3 and the controlled module 4 may be respectively a control module 3 including a control circuit and a controlled module 4 including a volume adjustment circuit, or may be a circuit in the form of a combined circuit containing both the control module 3 and the controlled module 4. The control command may be to perform a volume adjustment (for example, a program control, a voltage control, a current control or the like, and the present invention does not limit the way of realizing the control) through the volume adjustment circuit of the controlled module. The corresponding action may be to adjust output volume of the controlled module 4 such as the Bluetooth headset.

This embodiment further provides a skin texture control method. Because the specific implementation and operation principle have been clearly described in the embodiments of the aforementioned skin texture control system 1', the details are not described again here, referring to the embodiments of the aforementioned skin texture control system 1'.

Figure 35:
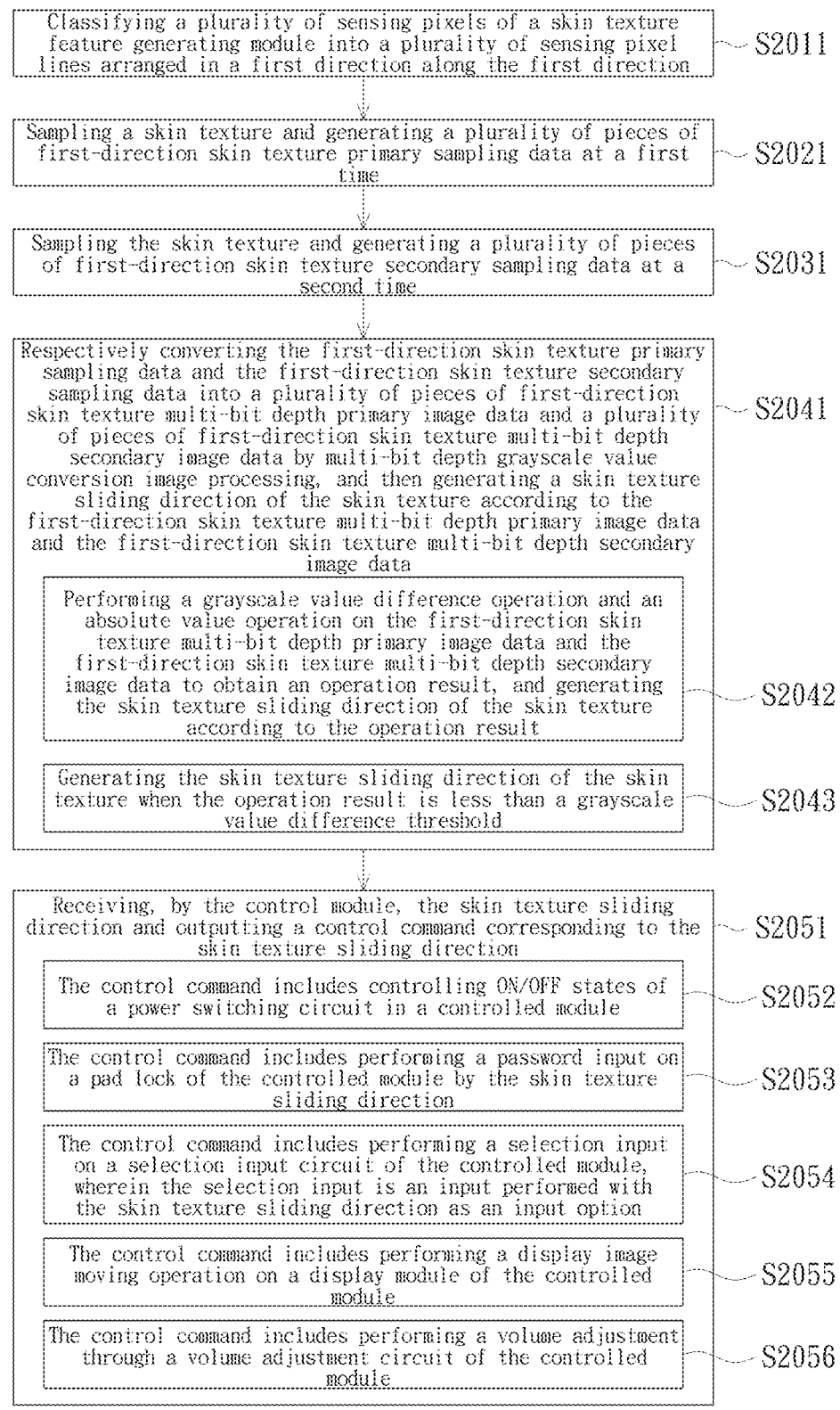
FIG. 35 is a flowchart of a skin texture control method provided by another embodiment of the present invention.

Referring to FIG. 35, the skin texture control method in this embodiment is applicable to the aforementioned skin texture control system 1', and the skin texture control system 1' includes: a skin texture feature generating module 2 and a control module 3, wherein the skin texture feature generating module 2 is connected to the control module 3, and the skin texture control method includes: step S2011: classifying a plurality of sensing pixels of the skin texture feature generating module into a plurality of sensing pixel lines arranged in a first direction along the first direction; step S2021: sampling a skin texture and generating a plurality of pieces of first-direction skin texture primary sampling data at a first time point; step S2031: sampling the skin texture and generating a plurality of pieces of first-direction skin texture secondary sampling data at a second time point; step S2041: respectively converting the first-direction skin texture primary sampling data and the first-direction skin texture secondary sampling data into a plurality of pieces of first-direction skin texture multi-bit depth primary image data and a plurality of pieces of first-direction skin texture multi-bit depth secondary image data by multi-bit depth grayscale value conversion image processing, and then generating a skin texture sliding direction of the skin texture according to the first-direction skin texture multi-bit depth primary image data and the first-direction skin texture multi-bit depth secondary image data; and step S2051: receiving, by the control module, the skin texture sliding direction and outputting a control command corresponding to the skin texture sliding direction.

The step S2041 of the skin texture control method applicable to the skin texture control system 1' may further include step S2042: performing a grayscale value difference operation and an absolute value operation on the first-direction skin texture multi-bit depth primary image data and the first-direction skin texture multi-bit depth secondary image data to obtain an operation result, and generating the skin texture sliding direction of the skin texture according to the operation result.

The step S2041 of the skin texture control method applicable to the skin texture control system 1' may further include step S2043: generating the skin texture sliding direction of the skin texture when the operation result is less than a grayscale difference threshold.

In the skin texture control method applicable to the skin texture control system 1', the skin texture sliding direction and the first direction are perpendicular to each other.

In the skin texture control method applicable to the skin texture control system 1', the skin texture control system 1' may further include a controlled module with a power switching circuit, the controlled module is connected to the control module for receiving the control command, and the step S2051 of the skin texture control method may further include: step S2052: the control command includes controlling ON/OFF states of the power switching circuit in the controlled module.

In the skin texture control method applicable to the skin texture control system 1', the skin texture control system 1' may further include a controlled module with a pad lock, the controlled module is connected to the control module for receiving the control command, and the step S2051 of the skin texture control method may further include: step S2053: the control command includes performing a password input on the pad lock of the controlled module by the skin texture sliding direction.

In the skin texture control method applicable to the skin texture control system 1', the skin texture control system 1' may further include a controlled module with a selection input circuit, the controlled module is connected to the control module for receiving the control command, and the step S2051 of the skin texture control method may further include: step S2054: the control command includes performing a selection input on the selection input circuit of the controlled module, wherein the selection input is an input performed with the skin texture sliding direction as an input option.

In the skin texture control method applicable to the skin texture control system 1', the skin texture control system 1' may further include a controlled module with a display module, the controlled module is connected to the control module for receiving the control command, and the step S2051 of the skin texture control method may further include: step S2055: the control command includes performing a display image moving operation on the display module of the controlled module.

In the skin texture control method applicable to the skin texture control system 1', the skin texture control system 1' may further include a controlled module with a volume adjustment circuit, the controlled module is connected to the control module for receiving the control command, and the step S2051 of the skin texture control method may further include: step S2056: the control command includes performing a volume adjustment through the volume adjustment circuit of the controlled module.

The present invention further provides a computer-readable medium storing a code of the aforementioned skin texture control method, and the code may be executed by a processor in any computer system to implement the aforementioned skin texture control method.

In each embodiment of the present invention, although it is written in the form of separate description, the matters mentioned in each embodiment may be applied in combination. For example, a combination of the skin texture control system 1 and the skin texture control system 1' may be implemented and applied to a Bluetooth headset. For example, when the user touches the skin texture feature generating module 2 of the Bluetooth headset by upward sliding of the skin texture, the call may be answered; when the user touches it by downward sliding of the skin texture, the call may be rejected; when the user touches it by the fingerprint area 1, the previous track in the music playlist may be selected; and when the user touches it by the fingerprint area 2, the next track in the music playlist may be selected. The matters mentioned in each embodiment of the present invention may be applied in combination as long as there is no conflict. The present invention is not limited to the listed embodiments.

In each embodiment of the present invention, the components using a same symbol represent that the components may also include the same function as those in other embodiments, which is not described again in the embodiments of the present invention. Only the differences from other embodiments are described. The matters mentioned in each embodiment may be applied in combination as long as there is no conflict. The present invention is not limited to the listed embodiments.

In each embodiment of the present invention, although the skin texture feature generating module included in the skin texture control system is in the form of including the sampling unit, the feature generation unit and the like as an embodiment, the skin texture feature generating module may also be directly used as the skin texture sampling device, and is implemented, for example, in the form of elements mentioned in each embodiment including the plurality of sensing pixels, the feature generating unit and the like (for example, the skin texture sampling device of the present invention may include the plurality of sensing pixels and the feature generating unit, in addition to sampling the skin texture of the user and generating the skin texture sampling data by the plurality of sensing pixels, the skin texture sampling device may also, by the feature generating unit, generate the skin texture stripe data and then generate the skin texture feature of the skin texture by the skin texture stripe data). The present invention should not be limited to expressive forms of the listed embodiments.

In conclusion, the present invention may sample the skin texture of the user and generate the skin texture sampling data in the first period of the working period, then generate the skin texture stripe data according to the skin texture sampling data and then generate the skin texture feature of the skin texture by the skin texture stripe data in the second period following the first period, and receive the skin texture feature and output the control command corresponding to the skin texture feature in the third period following the second period. With the above functions, the present invention does not need to pre-establish and store skin texture data of users and does not need to compare the skin texture data with the pre-established and stored skin texture data of the users, thereby achieving the technical effects of reducing the computational burden of the system, making the system operate faster, consuming less power, requiring less memory, and just informing others about a control mode of the skin texture feature in the system to authorize others to use the system even if there is a need to temporarily authorize others to use the system.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A skin texture control system, comprising:
    a skin texture feature generating module, for generating a skin texture feature of a skin texture in a working period, and the skin texture feature generating module comprising:
    a sampling unit, for sampling the skin texture and generating skin texture sampling data in a first period of the working period; and
    a feature generating unit, for generating skin texture stripe data according to the skin texture sampling data, and then generating the skin texture feature of the skin texture by the skin texture stripe data in a second period following the first period; and
    a control module, connected to the skin texture feature generating module, for receiving the skin texture feature and outputting a control command corresponding to the skin texture feature in a third period following the second period.

2. The skin texture control system according to claim 1, wherein the feature generating unit converts the skin texture sampling data into binary grayscale depth image data by binary image processing, and then generates the skin texture stripe data with a first binary grayscale value and a second binary grayscale value in the binary grayscale depth image data.

3. The skin texture control system according to claim 1, wherein the feature generating unit converts the skin texture sampling data into multi-bit grayscale depth image data by multi-bit depth grayscale value conversion image processing, and then generates the skin texture stripe data according to a multi-bit grayscale value in the multi-bit grayscale depth image data.

4. The skin texture control system according to claim 1, wherein the skin texture stripe data comprises at least any one of length, spacing, number, pores, and clarity of skin texture stripes.

5. The skin texture control system according to claim 1, wherein the skin texture feature comprises at least any one of a fingertip portion of a fingerprint, a side portion of the fingerprint, a finger pulp portion of the fingerprint, a skin texture size, and a skin texture deflection.

6. The skin texture control system according to claim 1, further comprising:
    a controlled module, having a power switching circuit and connected to the control module, for receiving the control command,
    wherein the control command comprises controlling ON/OFF states of the power switching circuit in the controlled module.

7. The skin texture control system according to claim 1, further comprising:
    a controlled module, having a pad lock and connected to the control module, for receiving the control command,
    wherein the control command comprises performing a password input on the pad lock of the controlled module, and the password input is a sequence of the skin texture feature generated when the skin texture touches the skin texture feature generating module.

8. The skin texture control system according to claim 1, further comprising:
    a controlled module, having a selection input circuit and connected to the control module, for receiving the control command,
    wherein the control command comprises performing a selection input on the selection input circuit of the controlled module, and the selection input is an input performed with the skin texture feature as an input option.

9. The skin texture control system according to claim 1, further comprising:
a controlled module, having a volume adjustment circuit and connected to the control module, for receiving the control command,
wherein the control command comprises performing a volume adjustment through the volume adjustment circuit of the controlled module.

10. The skin texture control system according to claim 1, wherein the feature generating unit generates the skin texture stripe data according to part of the skin texture sampling data in the second period of the working period.

11. A skin texture control method applicable to a skin texture control system, the skin texture control system comprising: a skin texture feature generating module and a control module, the skin texture feature generating module being connected to the control module, and the skin texture control method comprising:
sampling a skin texture and generating skin texture sampling data in a first period of a working period;
generating skin texture stripe data according to the skin texture sampling data, and then generating a skin texture feature of the skin texture by the skin texture stripe data in a second period following the first period; and
receiving the skin texture feature and outputting a control command corresponding to the skin texture feature in a third period following the second period.

12. The skin texture control method according to claim 11, wherein the method further comprises converting the skin texture sampling data into binary grayscale depth image data by binary image processing, and then generating the skin texture stripe data with a first binary grayscale value and a second binary grayscale value in the binary grayscale depth image data in the second period.

13. The skin texture control method according to claim 11, wherein the method further comprises converting the skin texture sampling data into multi-bit grayscale depth image data by multi-bit depth grayscale value conversion image processing, and then generating the skin texture stripe data according to a multi-bit grayscale value in the multi-bit grayscale depth image data in the second period.

14. The skin texture control method according to claim 11, wherein the skin texture stripe data comprises at least any one of length, spacing, number, pores, and clarity of skin texture stripes.

15. The skin texture control method according to claim 11, wherein the skin texture feature comprises at least any one of a fingertip portion of a fingerprint, a side portion of the fingerprint, a finger pulp portion of the fingerprint, a skin texture size, and a skin texture deflection.

16. The skin texture control method according to claim 11, wherein the skin texture control system further comprises a controlled module, having a power switching circuit and connected to the control module, for receiving the control command, and the skin texture control method further comprises: in the third period, the control command comprises controlling ON/OFF states of the power switching circuit in the controlled module.

17. The skin texture control method according to claim 11, wherein the skin texture control system further comprises a controlled module, having a selection input circuit and connected to the control module, for receiving the control command, and the skin texture control method further comprises: in the third period, the control command comprises performing a selection input on the selection input circuit of the controlled module, wherein the selection input is an input performed with the skin texture feature as an input option.

18. The skin texture control method according to claim 11, wherein the skin texture control system further comprises a controlled module, having a volume adjustment circuit and connected to the control module, for receiving the control command, and the skin texture control method further comprises: in the third period, the control command comprises performing a volume adjustment through the volume adjustment circuit of the controlled module.

19. The skin texture control method according to claim 11, wherein the method further comprises generating the skin texture stripe data according to part of the skin texture sampling data in the second period.

* * * * *